(12) United States Patent
Steinberg et al.

(10) Patent No.: US 12,200,137 B2
(45) Date of Patent: Jan. 14, 2025

(54) INTERPRETING PACKET COMMUNICATIONS

(71) Applicant: Navier, Inc., Chicago, IL (US)

(72) Inventors: David Steinberg, Chicago, IL (US); Ethan Bian, Chicago, IL (US); Christopher Swenson, Chicago, IL (US); Joshua Metnick, Chicago, IL (US); Vujadin Milinovich, Chicago, IL (US); Alex Lawn, Chicago, IL (US); Chen Ye, Chicago, IL (US)

(73) Assignee: DMG BLOCKCHAIN SOLUTIONS, INC. (CA)

( * ) Notice: Subject to any disclaimer, the term of this patent is extended or adjusted under 35 U.S.C. 154(b) by 533 days.

(21) Appl. No.: 17/427,896

(22) PCT Filed: Feb. 3, 2020

(86) PCT No.: PCT/US2020/016451
§ 371 (c)(1),
(2) Date: Aug. 2, 2021

(87) PCT Pub. No.: WO2020/163247
PCT Pub. Date: Aug. 13, 2020

(65) Prior Publication Data
US 2022/0123941 A1    Apr. 21, 2022

Related U.S. Application Data

(60) Provisional application No. 62/801,062, filed on Feb. 4, 2019.

(51) Int. Cl.
*H04L 9/32* (2006.01)

(52) U.S. Cl.
CPC .................. *H04L 9/3236* (2013.01)

(58) Field of Classification Search
CPC ...................................... H04L 9/3236
See application file for complete search history.

(56) References Cited

U.S. PATENT DOCUMENTS

| 11,770,398 | B1 * | 9/2023 | Erlingsson | G06F 16/3329 |
| | | | | 709/224 |
| 11,818,156 | B1 * | 11/2023 | Parikh | G06F 16/9537 |
| 11,831,749 | B1 * | 11/2023 | Fisher | H04L 9/0637 |
| 2018/0005318 | A1 * | 1/2018 | Pierce | G06Q 20/065 |

(Continued)

*Primary Examiner* — Stephen T Gundry
(74) *Attorney, Agent, or Firm* — Perkins Coie LLP

(57) ABSTRACT

A machine and a method of making and of using the machine. Illustratively, the machine includes, in a digital network, a node intermediate a miner client and a mining pool, the node representing the miner client to the pool, the node representing the mining pool to the miner client, the node implementing logic that: receives packet communications of a mining protocol from the miner client; interprets the packet communications to produce interpreted packet communications; routes new packet communications to the mining pool based on the interpreted packet communications; receives other packet communications of the mining protocol from the mining pool; interprets the other communications to produce other interpreted packet communications; and routes other new packet communications to the miner client based on the other interpreted packet communications.

21 Claims, 18 Drawing Sheets

(56) References Cited

U.S. PATENT DOCUMENTS

| | | | | |
|---|---|---|---|---|
| 2018/0109541 | A1* | 4/2018 | Gleichauf | H04W 12/06 |
| 2019/0306176 | A1* | 10/2019 | Gleichauf | H04L 63/123 |
| 2019/0370793 | A1* | 12/2019 | Zhu | H04L 9/50 |
| 2020/0013027 | A1* | 1/2020 | Zhu | H04L 9/50 |
| 2020/0076573 | A1* | 3/2020 | Deshpande | G06F 16/2465 |
| 2020/0195421 | A1* | 6/2020 | Gagnon | H04L 9/0637 |
| 2021/0357233 | A1* | 11/2021 | Liu | H04L 63/1425 |
| 2021/0399896 | A1* | 12/2021 | Chen | H04L 63/0421 |
| 2023/0118355 | A1* | 4/2023 | Wright | H04L 9/3297 705/71 |
| 2023/0119636 | A1* | 4/2023 | Conley | G06Q 20/3827 705/71 |
| 2023/0147842 | A1* | 5/2023 | Trevethan | H04L 9/0819 713/171 |
| 2023/0153614 | A1* | 5/2023 | Katz | G06Q 20/389 705/64 |
| 2023/0163948 | A1* | 5/2023 | Trevethan | H04L 9/3236 380/255 |
| 2023/0237468 | A1* | 7/2023 | Fletcher | H04L 9/3239 705/67 |
| 2023/0253980 | A1* | 8/2023 | Cooper | H03M 7/3059 |
| 2023/0273600 | A1* | 8/2023 | Cella | G06V 10/7784 702/188 |
| 2023/0334036 | A1* | 10/2023 | Covaci | G06F 16/2255 |
| 2023/0388248 | A1* | 11/2023 | Sastry | H04L 67/535 |

* cited by examiner

INTERPRETING PACKET COMMUNICATIONS

PRIORITY

This application claims the benefit of U.S. Provisional Patent Application No. 62/801,062 filed Feb. 4, 2019, entitled "Interpreting Packet Communications", which is hereby incorporated by reference in its entirety as if fully restated herein.

BACKGROUND

There are many problems in cryptocurrency processing, particularly those involving cheating: pools can be attacked by miners, and miners can be attacked by pools. The former is characterized in the following article, titled "The Miner's Dilemma—bitcoin mining pools security 51%" by Ittay Eyal, dated Dec. 3, 2014, (hackingdistributed.com/2014/12/03/the-miners-dilemma accessed 2/3/2020) sets out the problem of preventing cheating.

Mining pools are an essential part of the Bitcoin ecosystem. They enable many small miners to operate at reasonable business risk. However, they also pose a risk to the currency, as successful open pools have been able to grow dangerously big in the past.

Until now, there have been few forces to counteract this phenomenon. Gavin Andresen, chief scientist of the Bitcoin Foundation, has repeatedly urged miners to use smaller pools, and researchers, including ourselves, have suggested technical fixes to reduce pool size (here and here). But alas, community pressure has only had limited success, and technical solutions are still under development and far from production.

Today, I will explain why all this may not be necessary. In an analysis I placed in arXiv, I show that open pools face what I call the miner's dilemma—a version of the prisoner's dilemma where miners can choose to attack or leave each other alone. I found that any open pool can increase its own profits by attacking another open pool. However, if both attack each other, both earn less than if none attacks.

It is well-known that a pool can attack another open pool by pretending to work on its behalf, and thereby taking a cut off of its proceeds, but never contributing by discovering blocks. Until recently, it was believed that this attack could not increase the attacker's profits. See below for details on previous work.

Since block withholding attacks are not prevalent (this is one exception), at least as far as we know, we can surmise that pools make the right choice and agree to refrain from attacking each other. However, my analysis shows that this is an unstable balance. It is worthwhile for a pool to refrain from attacking only as a part of an overall truce agreement in which it is not attacked. If a single pool starts attacking its peers, it will force them to retaliate.

Once this happens, the profitability of public pools will deteriorate, leading miners to choose other pooling options, for example closed pools of miners that trust one another. Such trust circles are naturally going to be much smaller than open public pools. The dismantling of overly large pools will bring Bitcoin to a safer footing than what we have today, where a handful of large pools dominate mining.

Now it's time to get technical. I will outline the attack and the tools used for its analysis, and then go over the main results. The gory details are in arXiv. But first, some background. Skip ahead to Pool Block Withholding if you are familiar with the mechanics of mining, pools and the classical block withholding attack.

Background—Miners, Pools and Block Withholding
Miners and Pools

Bitcoin's security stems from the vast compute resources of many participants called miners. These participants contribute their compute power, called mining power, and the system rewards them with Bitcoin. We assume that the miners follow the honest mining protocol, and therefore the payoff of a miner is proportional to its ratio of mining power out of all mining power in the system. Reward distribution occurs as blocks are discovered with proofs of work, and each miner produces proof of work with probability proportional to its mining power.

Bitcoin gives out a block reward, 25 BTC as of today, every 10 minutes on average. This means that a miner whose power is a small fraction of the total mining power is unlikely to win in a very long time. Since this can take years, miners congregate in pools. A pool has a manager, and whenever a participant in the pool finds proof of work, the reward goes to the manager, which distributes it among the participants according to their contribution to the pool.

In order to estimate the effort exerted by its participants, the pool manager receives from its miners not only the full proofs of work that go to the Bitcoin system, but also partial proofs of work. Partial proofs are similar to full proofs, but are much easier to produce, so small miners produce them at a sufficient frequency to allow a good estimate of their power. These partial proofs of work enable the pool manager to make sure that a miner indeed put effort into working on behalf of the pool, as a miner would naturally discover them during the effort to find a full proof of work, and they demonstrate just how much effort that miner put into discovering a solution.

Many of the pools are open pools. They have a public web interface where miners log in to register. After registering, miners point their mining hardware to a designated server and receive mining tasks. They send back to the server partial proofs of work as well as full proofs of work, and the pool manager credits their account based on their contribution and the pool's revenue.

Currently, mining pools are much larger than they should be. A pool smaller than 5% can provide sufficient stability for a miner. But large pools sometimes get close to 50%, which can have serious consequences. Moreover, even pools smaller than 50% can break the system. As we will see below, it now turns out that this problem may resolve itself.
The Classical Block Withholding Attack The classical block withholding attack is as old as pools themselves. It is an attack performed by pool participants to sabotage the revenue of the pool and its other participants. An attacking miner sends to the pool only partial proofs of work, but discards full proofs if it finds them. The pool therefore shares its revenue with the attacker, but does not benefit from its mining power. This reduces the revenue of all participants in the attacked pool, but also the revenue of the attacker itself, which could earn more by just mining fairly.

We note that a proof of work can only be used by the creator of the task. The attacker cannot repurpose it to collect any revenue.
Pool Block Withholding Can block withholding be used to increase the revenue of a miner? The question was recently raised by Gavin Andresen, chief scientist of the Bitcoin Foundation. And although an exact attack strategy was not published before, it was recently shown that the answer is positive in certain circumstances.

We will now see what happens when pools issue block withholding attacks against one another.

Attack Strategy

A pool has many loyal miners that work on what the pool manager tells them to. A standard pool uses all its loyal miners for mining on its own behalf. An attacker, however, does the following: The manager uses some of its miners for its own mining, as usual. Concurrently, he infiltrates a victim pool by registering as a regular miner. He then receives mining tasks from the victim, and sends them to some its loyal miners. The mining power the attacker redirects towards the victim's tasks is called the infiltration rate and the miners are infiltrating miners. When the attacker receives partial proofs of work from its infiltrating miners, it sends them to the victim, which estimates their true mining power. However, when it receives full proofs of work from the infiltrating miners, it withholds and discards them, and thereby does not contribute to the victim's revenue (note that the miner could have used the infiltration rate for its own mining, so it incurs a cost of opportunity by diverting these miners). The victim pool is tricked into thinking that the infiltrating work force is doing effective mining and shares its revenue with the attacking pool. The attacker distributes its revenue from its own mining and from its infiltration among all its loyal miners.

The Pool Game

The revenue of the pools is influenced by several factors. A victim pool's effective mining rate is unchanged by an attack, but its total revenue is divided among more miners. An attacker's mining power is reduced, since some of its miners are used for block withholding, but it earns additional revenue through its infiltration of the other pool. And finally, the total effective mining power in the system is reduced, causing the Bitcoin protocol to reduce the difficulty.

Taking all these factors into account, we observe that, counter to one's intuition, a pool might be able to increase its revenue by diverting its mining power to attack other pools. Each pool therefore makes a choice of whether to attack each of the other pools in the system, and with what infiltration rate. This gives rise to the pool game.

The Miner's Dilemma

My analysis of the pool game shows that a pool can always increase its revenue by attacking an honest pool. Whatever the pool sizes may be. This is somewhat surprising: the attacker increases its profit by discarding proofs of work. As always in life and research, the devil is in the details, but here are two factors that are in the attacker's favor. First, he doesn't lose much by discarding proofs of work, since he still submits partial proofs of work to the infiltrated pool, and the victim pays back pretty well. Second, by reducing the overall effective mining power, the revenue of his own mining increases.

But what if the other pool retaliates? This is when things get even more interesting. If two pools attack each other (while the others are mining as usual), the pools should adjust their infiltration rates to their optimum. At this equilibrium point, neither pool can improve its revenue by using more or less miners to infiltrate the other. So the pools have a choice—whether to attack by optimizing their revenue, or mine without attacking. This is a version of the prisoner's dilemma.

In the classical prisoner's dilemma two partners in crime have to decide whether to testify. If neither testifies, they both go to prison for a year. If one testifies, he is released and his partner is imprisoned for 5 years. If both testify, they are both imprisoned for 2 years. So testifying is a dominant strategy; a prisoner will be better off testifying whatever his partner does. However, if they follow the dominant strategy they end up in a tragedy of the commons where both are worse off than if neither testifies.

The situation in the pool's case is similar. If neither attacks, they both work fairly and their miners earn what they deserve. If one attacks, it improves its revenue, and the revenue of the other deteriorates. If both attack, at equilibrium, each earns less than if neither had attacked, but more than if only the other had attacked. Attacking is therefore a dominant strategy. A pool will improve its revenue by attacking, whether the other pool attacks or not.

Defenses

To hide the pool block withholding attack, an attacker can register with the victim pool as multiple miners, each with small mining power. Although the victim will realize he is under attack from his reduced revenue, it is difficult for him to realize which of his miners are attacking it. They all send partial proofs of work, but each seldom finds a full proof of work, therefore it takes a long time to have a statistically significant proof that blocks are withheld. This makes defense against block withholding difficult. The attack can also be performed anonymously, since pool registration typically requires only a Bitcoin address for revenue collection and/or an email address. The victim has no idea who his miners are.

Further Reading and Related Work

The pool block withholding attack described here is distinct from and orthogonal to the selfish mining strategy. In block withholding attacks, blocks are discarded, whereas in selfish mining, they are just kept secret until the right time to publish them. Block withholding is done by infiltrating another pool whereas in selfish mining other miners are treated as opaque, or closed pools.

Pools use various methods to distribute their revenues among their participants. For the interested reader, Meni Rosenfeld's overview is a good start.

The Bottom Line

The analysis I outlined here shows that it is better for all pools to refrain from attacking. However, for short term profits, a pool might decide to attack its peers and break the balance. If the profits of open pools are reduced, miners will look for alternatives such as smaller, closed pools. They can get steady income from pools well below 10%, and they have only little incentive to use very large pools; it's mostly convenience and a feeling of trust in large entities.

The dismantling of overly large pools is one of the most important and difficult tasks facing the Bitcoin community. My analysis shows that short-term incentives can cause this dismantling to occur spontaneously, making the Bitcoin infrastructure more distributed, and so more robust and secure."

Another problem is that pools can underreport the amount of work a miner does, thereby cheating to steal revenues. For example, a pool may mark a miner's share as stale even if it was not stale.

The prices of cryptocurrency change dynamically in real time according to the free market, yet mining is often a slow and inefficient industry that does not respond in real time to the market, because it lacks the tools and infrastructure to do so.

Finally, cryptocurrency mining requires substantial technical knowledge in software, networking, and distributed cryptographic technologies to attain competitive performance and profitability. The devices used in mining expose very limited, low-level interfaces that can only be accessed by privileged users on a local network. Furthermore, the vast majority of such devices are connected to mining pools across the Internet in order to achieve a practical bound on variance in revenue streams. Although such pools are in control of the revenue streams of nearly every cryptocurrency mining operation, there has emerged no practical, automated tool for verification that reported revenues are fair and correct based directly on the work a mining device performs, especially in real time. Needs also exist for minimizing this attack surface, especially in an adaptable variety of approaches.

SUMMARY

The disclosure below uses different embodiments to teach the broader principles with respect to articles of manufacture, apparatuses, processes for using the articles and apparatuses, processes for making the articles and apparatuses, and products produced by the process of making, along with necessary intermediates. This Summary is provided to introduce the idea herein that a selection of concepts is presented in a simplified form as further described below. This Summary is not intended to identify key features or essential features of subject matter, nor this Summary intended to be used to limit the scope of claimed subject matter. Additional aspects, features, and/or advantages of examples will be indicated in part in the description which follows and, in part, will be apparent from the description, or may be learned by practice of the disclosure.

The following description and drawings are illustrative and are not to be construed as limiting. Numerous specific details are described to provide a thorough understanding of the disclosure. However, in certain instances, well-known or conventional details are not described in order to avoid obscuring the description.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

With the foregoing in mind, illustratively in a machine implementation, the machine includes, in a digital network, a node intermediate a miner client and a mining pool, the node representing the miner client to the pool, the node representing the mining pool to the miner client, the node implementing logic that: receives packet communications of a mining protocol from the miner client; interprets the packet communications to produce interpreted packet communications; routes new packet communications to the mining pool based on the interpreted packet communications; receives other packet communications of the mining protocol from the mining pool; interprets the other communications to produce other interpreted packet communications; and routes other new packet communications to the miner client based on the other interpreted packet communications. In some, but not necessarily all embodiments, there can be a closed feedback loop to the process of mining. And in some, but not necessarily all embodiments, implementations are adapted to extract data directly from the network communications of mining devices, and use such data, in some cases in conjunction with other data such as cryptocurrency market pricing, to validate mining revenues, or said another way, prevent cheating. In some, but not necessarily all embodiments, implementations are adapted transform the network communications, at the will of authenticated mining device operators, to effect configuration changes at the device level, without requiring local network access.

MODES

Figure 1:
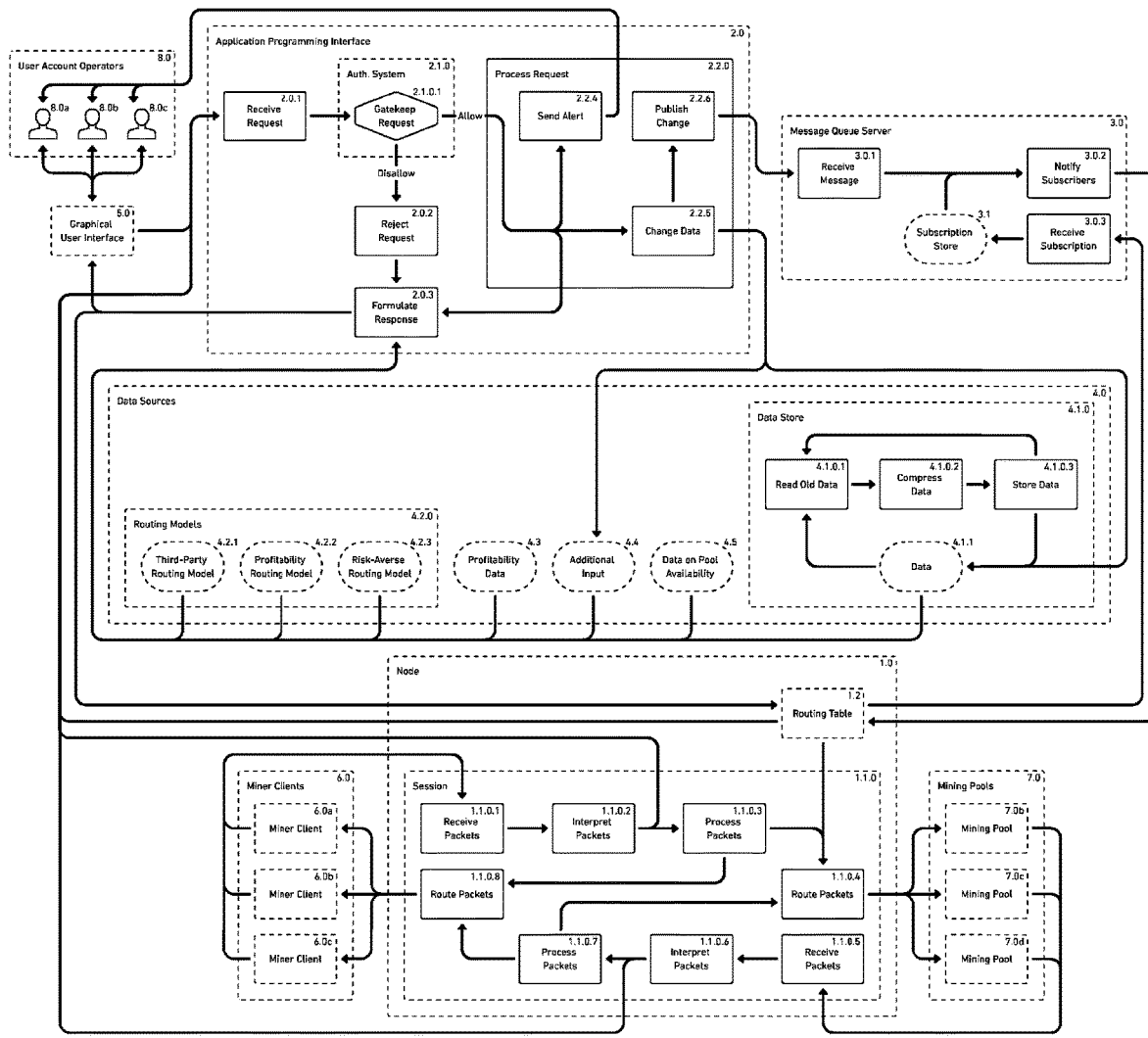
FIG. 1 is a schematic illustration of an embodiment.

In the non-limiting examples of the present disclosure, with regard to the figures provided herewith, it is to be understood that reference characters may contain a dot character (".") to show hierarchy, e.g. "2.3." It is further to be understood that any trailing "0.0" (before an alphabetic suffix, e.g. "b," if present) may be added to any reference character or ignored without changing the semantic meaning of the reference character. For instance, "6.1," "6.1.0," and "6.1.0.0" are all to be understood as the same reference character. Once again, this is done for the purpose of clarifying hierarchy: when an object "6.1" is referred to in relation to a parent object "6.0," the form "the object 6.1" will usually be used; but when the object "6.1.0" is referred to in relation to a child object "6.1.7," the form "the object 6.1.0" will usually be used.

It is also to be understood that a reference character may refer to an entity, an operation, or a collection. In the case that the reference character refers to a collection, e.g. a group "10.0" containing functionally identical items "10.0a" and "10.0b" and a specialized item "10.1," the reference character "10.0" may refer either to the collection as a whole or to a generic element contained within the collection. For example: "The object 6.1 communicates with items 10.0. When the object 6.1 receives a message from an item 10.0, the object 6.1 proceeds by . . . ." Here, the first mention of "10.0" refers to the whole group, whereas the second mention refers to a single member of the group, which could be any of "10.0a," "10.0b," or "10.1."

FIG. 1 schematically illustrates a system wherein a node 1.0 intermediates communications of miner clients 6.0 and mining pools 7.0, implementing logic that interprets and routes the communications. In some embodiments, these can be facilitated by using a routing table 1.2. Where desired, an application programming interface 2.0 can provide input to the node 1.0, such as from a variety of data sources 4.0, influencing or controlling the way the node 1.0 routes packet communications. A message queue server 3.0, for example, can be used to deliver changes to the additional input 4.4 to the node 1.0 in real time. A graphical user interface 5.0, where used, facilitates interaction with the application programming interface 2.0 by user account operators 8.0.

From another perspective, FIG. 1 schematically illustrates an apparatus wherein a node 1.0 intermediates communications of miner clients 6.0 (e.g., a first miner client 6.0a, a second miner client 6.0b, a third miner client 6.0c, etc.), and mining pools 7.0 (e.g., a first mining pool 7.0a, a second mining pool 7.0b, a third mining pool 7.0c, etc.). Upon receiving 1.1.0.1 packet communications of a mining protocol in a session 1.1.0 from a miner client 6.0, the node 1.0 interprets 1.1.0.2 the packet communications to produce interpreted packet communications.

In general, a mining protocol is an application-layer protocol by which a miner client 6.0 and a mining pool 7.0 may communicate in order to carry out the process of pool mining, by which the miner client 6.0 performs work of cryptocurrency mining and submits the work to the mining pool 7.0, and the mining pool 7.0 receives the work, combines the work with any amount of other work to create a combined work, and publishes the work to a cryptocurrency network.

Work of cryptocurrency mining is typically, though need not be, computation of cryptographic hashes for the purpose of carrying out "proof of work," a cryptographic method of securing a cryptocurrency wherein a miner client 6.0 (or pool of miner clients 6.0 represented by a mining pool 7.0) performs cryptographic hashes, and is rewarded for doing so with an opportunity to add transactions published to the cryptocurrency network to a transaction ledger (or "blockchain") and claim transaction fees (a quantity of the cryptocurrency) associated with the transactions.

One example of a mining protocol that is of particular importance today is Stratum, a protocol which replaced the earlier Getwork protocol. Stratum lacks formal specification and is defined mainly by its implementation by various designers of miner client and mining pool software.

The interpreted packet communications produced by the node 1.0 are simply a representation of the packet communications which is comprehensible to the node 1.0 to the extent that the node 1.0 may carry out routing logic particular to a protocol of the packet communications. The representation need not differ from how the packet communications are represented on receipt by the node 1.0, so long as the representation is sufficiently comprehensible to the node 1.0. For instance, the node 1.0 may receive packet communications containing a message of the Stratum protocol:

{"id": 1, "method": "mining.subscribe", "params": ["cgminer/4.10.0"]}

In this case, the node 1.0 might interpret the packet communications as a first message, by the miner client 6.0, which claims to run version 4.10.0 of a cryptocurrency mining program "cgminer," in a sequence of many, requesting to subscribe to work from a mining pool 7.0. Different embodiments of the node 1.0 represent this analysis differently; for example, one embodiment might represent the interpreted packet communications as a set of key/value pairs:

{("type", "subscribe"), ("agent", "cgminer"), ("agent-version", "4.10.0"), ("id", 1)}

From the representation, the node 1.0 can carry out routing logic of the protocol of the packet communications.

Then, using the interpreted packet communications, as well as any previously-derived interpreted packet communications gathered in the session 1.1.0, the node 1.0 selects a mining pool 7.0 to which the node 1.0 represents the miner client 6.0. That is, unlike an attacker that represents itself to the mining pool 7.0, e.g., using the work the miner client 6.0 produced, embodiments herein pertain to "representing" themselves to the miner client 6.0 as a proxy to a mining pool 7.0. Indeed, the attacker does not represent itself to the miner client 6.0 at all but rather hides itself from the miner client 7.0 as much as possible. Embodiments herein represent the miner client 6.0 to the mining pool 7.0, as if claiming to the mining pool 7.0 that the embodiment is the miner client 6.0. Thus, unlike embodiments herein, the attacker does not represent the miner client 6.0 to the mining pool 7.0, nor the mining pool 7.0 to the miner client 6.0.

In some embodiments, the node 1.0 may select a mining pool 7.0 to which it represents the miner client 6.0 using a routing table 1.2.0, which synthesizes information from a variety of sources, e.g., from an application programming interface 2.0, from a message queue server 3.0, or from other data sources. After selecting the mining pool 7.0, the node 1.0 transmits new packet communications based on the interpreted packet communications to the mining pool 7.0.

The new packet communications are created in response to receiving the packet communications. At face value, the new packet communications may not be directly related to the packet communications, instead facilitating the node 1.0 to carry out complex protocol-specific routing and proxying logic. For instance, if the node 1.0 receives packet communications which are interpreted as a subscription for work to a mining pool 7.0 from a miner client 6.0 claiming to use a cryptocurrency mining program "cgminer," the node 1.0 may produce packet communications which would be interpreted by the mining pool 7.0 as a subscription for work to the mining pool 7.0 from a virtual miner client claiming to use the node 1.0 (via an identifiable name) as an agent.

In another instance, the node 1.0 may receive packet communications which are interpreted as authentication to a mining pool 7.0 by way of a worker name (and additionally, in some cases, a worker password). On receipt of such packet communications, the node 1.0 may bypass communications with any mining pool 7.0 entirely and send packet communications to the miner client 6.0 that the miner client 6.0 would interpret as a command to disconnect from and reconnect to the node 1.0. This behavior might be used by the logic of the node 1.0 in order to successfully represent the miner client 6.0 to the mining pool 7.0 under some mining protocols or variants of mining protocols.

In some embodiments, the node 1.0 may be configured to interpret packet communications of more than one mining protocol, e.g. Stratum and Getwork. In some, but not all, embodiments, the node 1.0 may require that the miner client 6.0 and mining pool 7.0 use the same mining protocol in their respective packet communications. However, in other embodiments, the node 1.0 may instead be configured to receive packet communications of a first mining protocol from the miner client 6.0 and produce new packet communications of an other mining protocol which is understood by the mining pool 7.0 and receive packet communications of the other mining protocol from the mining pool 7.0 and produce other new packet communications of the first mining protocol which is understood by the miner client 6.0. Thus, the node 1.0 would be capable of intermediating mining protocols.

Further, in some embodiments, the node 1.0 may be configured to receive packet communications of an encrypted mining protocol. Before the miner client 6.0 or mining pool 7.0 sends packet communications to the node 1.0, the miner client 6.0 may encrypt the packet communications (e.g. using the Transport Layer Security protocol). If the node 1.0 is configured to receive encrypted packet communications, the node 1.0 first decrypts the encrypted packet communications before producing interpreted packet communications. The node 1.0 additionally encrypts any new packet communications before transmitting them to the miner client 6.0 or mining pool 7.0. Thus, the node 1.0 is configured to intermediate encrypted communications between the miner client 6.0 and the mining pool 7.0. It should be understood that when the node 1.0 is configured in this way, the miner client 6.0 is aware that it is communicating by way of the node 1.0 and not to the mining pool 7.0 directly, to the extent that the miner client 6.0 can verify the identity of the node 1.0 for the purposes of exchanging encryption keys.

It is also possible that, in some, but not all, embodiments, the miner client 6.0 sends encrypted packet communications to the node 1.0 and expects encrypted packet communications in return while the mining pool 7.0 is configured to send and receive unencrypted packet communications, or that the mining pool 7.0 sends encrypted packet communications to the node 1.0 and expects encrypted packet communications in return while the miner client 6.0 is configured to send and receive unencrypted packet communications; thus the node 1.0 can intermediate packet communications in which one party, and not an other, is configured to send and receive encrypted packet communications.

The node 1.0 processes 1.1.0.3 the packet communications and routes 1.1.0.4 the new packet communications to the mining pool 7.0. In some cases, when directed by the logic of the node 1.0, the node 1.0 may instead route 1.1.0.8 the new packet communications to the miner client 6.0 rather than the mining pool 7.0.

Subsequently, when the node 1.0 receives 1.1.0.5 other packet communications from the mining pool 7.0, the node 1.0 interprets 1.1.0.6 the other packet communications to produce other interpreted packet communications, processes 1.1.0.7 the other packet communications, then routes 1.1.0.8 other new packet communications back to the miner client 6.0, etc. In some cases, when directed by the logic of the node 1.0, the node 1.0 may instead route 1.1.0.4 the other new packet communications to the mining pool 7.0 rather than the miner client 6.0.

The other interpreted packet communications, like the interpreted packet communications, are simply a representation of the other packet communications which is comprehensible to the node 1.0 to the extent that the node 1.0 may carry out routing logic particular to a protocol of the packet communications. For instance, the node 1.0 may receive packet communications containing the Stratum message:

{"method": "client.reconnect", "params": [ ], "id": null}

In this case, the node 1.0 might interpret the packet communications as a response by the mining pool 7.0 to the miner client 6.0 which instructs the miner client 6.0 do disconnect from and reconnect to the mining pool 7.0 (which if forwarded to the miner client 6.0 would be interpreted as an instruction to disconnect from and reconnect to the node 1.0). Different embodiments of the node 1.0 represent this analysis differently; for example, one embodiment might represent the interpreted packet communications as a set of key/value pairs, in this example containing only one pair:

{("type", "reconnect")}

From this representation, the node 1.0 can carry out routing logic of the protocol of the packet communications.

At any time while processing the packet communications, the node 1.0 may persistently store the packet communications, the interpreted packet communications, or both in a data store 4.1.0, in some embodiments via the application programming interface 2.0. In some embodiments, the data store 4.1.0 compresses data as it ages. To do this, data 4.1.1 in the data store 4.1.0 is periodically read 4.1.0.1, compressed 4.1.0.2, and replaced 4.1.0.3.

In some but not all embodiments, one or more data sources 4.0 (e.g., an additional input 4.4, data on mining pool availability 4.5, data on the profitability of various cryptocurrencies 4.3, or various routing models 4.2.0 (e.g., a third-party routing model 4.2.1, a profitability routing model 4.2.2, or a risk-dispersing routing model 4.2.3), or the data store 4.1.0) can be used to affect the operations of the node 1.0, particularly, but not exclusively, in how the node 1.0 routes the packet communications to the mining pools 7.0.

The data on mining pool availability 4.5 may be retrieved from a trusted third party, or computed by an entity of the apparatus. In some embodiments, the data on mining pool availability 4.5 may be determined by the node 1.0 itself. When the node 1.0 attempts to connect to a mining pool 7.0 on behalf of the miner client 6.0, the node 1.0 may determine that the mining pool 7.0 is unresponsive or otherwise underperformant (e.g. the mining pool 7.0 rejects an abnormally high percentage of work submissions).

The data on profitability of cryptocurrencies 4.3 may also be derived in myriad ways. The data on profitability of cryptocurrencies 4.3 may, for instance, be retrieved from a trusted third party, or computed by an entity of the apparatus. In general, profitability of mining a cryptocurrency is a function of any of cost of electricity, cost of the miner client 6.0, power usage of the miner client 6.0, efficiency of the miner client 6.0, difficulty of mining the cryptocurrency (which is itself a function of how much computational power is contributed to the network), price of a unit of the cryptocurrency, what percentage of mining rewards the mining pool 7.0 collects as a fee, and mining reward policy of the cryptocurrency.

A programmatic routing model 4.2.0 is a logical framework that can be followed to select a mining pool 7.0 for which a miner client 6.0 should perform work. The programmatic routing model 4.2.0 may accept any number of inputs, such as data sources describing profitability or pool availability. The programmatic routing model 4.2.0 may behave in any way, for example, always dictating the same mining pool 7.0 in every case; switching between multiple mining pools 7.0 on a timer; randomly selecting one of many compatible mining pools 7.0; switching to a different mining pool 7.0 when it becomes more profitable to do so; etc. The programmatic routing model 4.2.0 may be implemented entirely by the node 1.0, or with the aid of any relevant entity, e.g. the application programming interface 2.0, the message queue server 3.0, the various data sources 4.0, a source indicating time, a source indicating geographic location in relation to the geographic location of mining pool 7.0 servers, etc.

The third-party routing model 4.2.1, made available to the node 1.0 or the application programming interface 2.0, may dictate any kind of routing logic, as desired. The third-party routing model 4.2.1 may be as complex as an optimal combination of several other routing models 4.2.0 or as simple as a routing model 4.2.0 that always routes packet communications to a singular, pre-defined mining pool 7.0.

The profitability routing model 4.2.2 is one that takes into account the data on profitability of cryptocurrencies 4.3 in order to select a mining pool 7.0 that will yield the highest reward or the least cost for the miner client 6.0.

The risk-dispersing routing model 4.2.3 is one that selects a mining pool 7.0 as to minimize the negative effect, for an owner of the miner client 6.0, an operator of the miner client 6.0, or a manager of the miner client 6.0, of value of one cryptocurrency dropping suddenly, or one mining pool 7.0 becoming underperforming.

In embodiments such as is illustrated in FIG. 1, these data sources 4.0 are consumed by the application programming interface 2.0, then delivered to the node 1.0 upon request by the node 1.0. In another embodiment, any of the data sources 4.0 may be accessed directly by the node 1.0.

Where desired in one implementation or another, as is illustrated in the embodiment of the system depicted in FIG. 1, the application programming interface 2.0 receives 2.0.1 a request from an application programming interface client 10.0 (e.g., the node 1.0, the graphical user interface 5.0, etc.). As may or may not be desired for an implementation, an authentication system 2.1.0 can be provided, such as within the application programming interface 2.0, that can gatekeep 2.1.0.1 the requests received by the application programming interface 2.0 (see FIG. 5). If the authentication system 2.1.0 allows the request, the application programming interface 2.0 processes 2.2.0 the request. While processing 2.2.0 the request, the application programming interface 2.0 may, if so desired, perform any of the following actions: send 2.2.4 an alert to a user account operator 8.0 (e.g., a first user account operator 8.0a, a second user account operator 8.0b, or a third user account operator, 8.0c); change 2.2.5 data in any of the data sources 4.0; and publish 2.2.6 a message to the message queue server 3.0. If the authentication system 2.1.0 disallows the request, the application programming interface 2.0 rejects 2.0.2 the request. In either case, the application programming interface 2.0 formulates 2.0.3 a response, which is transmitted to the application programming interface client 10.0. In another embodiment, the application programming interface 2.0 may not formulate 2.0.3 any response to be transmitted to the application programming interface client 10.0 if the authentication system 2.1.0 rejects the request, based on the reason for which the authentication system 2.1.0 rejected the request, in an attempt to mitigate the effects of a Denial-of-service attack waged against the application programming interface 2.0.

In some embodiments, the message queue server 3.0 may be used to notify 3.0.2 the node 1.0 of changes to the data sources 4.0 that affect operations of the node 1.0. When the message queue server 3.0 receives 3.0.3 a subscription to a message topic from a subscriber (e.g. the routing table 1.2.0 of the node 1.0), the message queue server 3.0 facilitates storing an entry recording the subscriber and the topic, e.g., in a subscription store 3.1. Subsequently, when the message queue server 3.0 receives 3.0.1 a message (e.g., from the application programming interface 2.0) pertaining to the topic, the message queue server 3.0 facilitates a notification directed to the subscriber (e.g., the routing table 1.2 of the node 1.0). Thus, the message queue server 3.0 allows the node 1.0 to be notified in real time of changes to the data sources 4.0 that affect routing. The use of the message queue server 3.0 in this way also allows the node 1.0 to be notified of the changes without polling, i.e., without needing to periodically ask the message queue server 3.0 whether a new change has been made. Instead, the node 1.0 can open a connection to the message queue server 3.0 before a new change is made, receive notification of the change, and subsequently close the connection after the change has been received.

Figure 2:
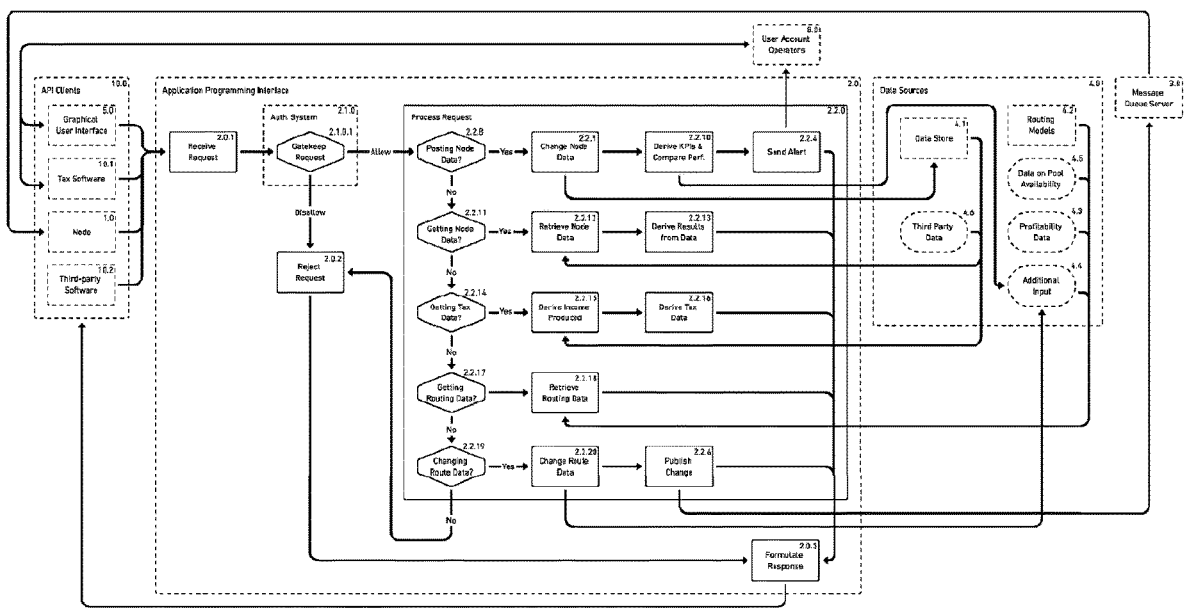
FIG. 2 is a schematic illustration pertaining to an application programming interface of an embodiment.

FIG. 2 schematically illustrates an application programming interface 2.0 that can, but need not, be used to carry out certain embodiments, such as that in FIG. 1, herein showing greater detail of one way an application programming interface 2.0 might be implemented and how the application programming interface 2.0 interacts with other elements of various embodiments. Various application programming interface clients 10.0 (e.g. the graphical user interface 5.0, tax preparation software 10.1, the node 1.0, or third-party software 10.2) interact with the application programming interface 2.0 by issuing a request. In some embodiments, the application programming interface 2.0 may respond by changing 2.0.20/2.0.9/2.0.10 data in at least one of the data sources 4.0 (e.g. the data store 4.1 or the additional input 4.4); by publishing 2.2.6 a message to the message queue server 3.0; by sending 2.2.4 an alert to a user account operator 8.0; or by performing any number of other operations in response to the request.

In the embodiment shown in FIG. 2, a user account operator 8.0 is able to interact with a graphical user interface 5.0 and tax software 10.1, which in turn issue requests to the application programming interface 2.0, e.g. to retrieve node data stored in the data store 4.1, or to request data indicating an amount of income produced by miner clients 6.0 owned or managed by the user account operator 8.0. The node 1.0 may also issue requests against the application programming interface 2.0, e.g. when retrieving routing data or storing packet communications or interpreted packet communications or both.

The application programming interface receives 2.0.1 a request from an application programming interface client 10.0, e.g., the graphical user interface 5.0, tax software 10.1, the node 1.0, or third-party software 10.2. If an embodiment involves the tax software 10.1, the tax software 10.1 is such as to be used solely for preparing a tax or information return or other tax filing, including one that records, transmits, transfers, or organizes data related to such filing, and/or used solely for financial management, to the extent that it is severable from any tax strategy or does not limit the use of any tax strategy by any taxpayer or tax advisor.

Subsequently, if so desired, the authentication system 2.1.0 gatekeeps 2.1.0.1 the request, either allowing or disallowing it. If the authentication system 2.1.0 disallows the request, the application programming interface 2.0 can reject 2.0.2 the request. If the authentication system 2.1.0 allows the request, the application programming interface can process 2.2.0 the request. In either case or the like, the application programming interface 2.0 can formulate 2.0.3 a response to the request, e.g., after processing 2.2.0 or rejecting 2.0.2 the request. The response can then be transmitted to the application programming interface client 10.0.

When processing the request, the application programming interface can first check 2.2.8 whether the request is attempting to post new or updated node data to the data store 4.1. If so, the application programming interface 2.0 can change 2.2.9 the node data in the data store 4.1. In some embodiments, the application programming interface 2.0 may also do any of the following: derive 2.2.10 one or more performance metrics from the new or updated data; compare 2.2.10 the performance of a miner client 6.0 described by the new or updated data against a theoretical performance of the miner client 6.0; and send 2.2.4 an alert to a user account operator 8.0.

If the application programming interface 2.0 (or any other component of the apparatus) derives 2.2.10 a performance metric, the performance metric may be any of (but not limited to) the following: a hash rate (measured in cryptographic hashes performed by the miner client 6.0 per unit of time), a generic work speed (measured in units of work performed by the miner client 6.0 per unit of time), a number of units of work submitted by the miner client 6.0, and a percentage of time the miner client 6.0 was found to be submitting work.

If the application programming interface 2.0 (or any other component of the apparatus) compares 2.2.10 the performance of the miner client 6.0 against the the theoretical performance of the miner client 6.0, it is useful to do so taking into account the model of the miner client 6.0. Comparing 2.2.10 may also be used to suggest a more profitable model of miner client to use, given the performance of the miner client 6.0, the theoretical performance of the miner client 6.0 of the model, and the theoretical performance of a miner client 6.0 of a different model.

If the request is not attempting to post new or updated node data to the data store 4.1, the application programming interface 2.0 may check 2.2.11 whether the request is attempting to retrieve derived node data from the data store 4.1. If so, the application programming interface 2.0 may retrieve 2.1.12 node data from the data store 4.1 and derive 2.2.13 the derived node data, which is included when formulating 2.0.3 the response.

If the request is not attempting to retrieve derived node data from the data store 4.1, the application programming interface 2.0 may check 2.2.14 whether the request is attempting to retrieve tax-related data. If so, the application programming interface 2.0 may derive 2.2.15 the amount of income produced by a miner client 6.0 provided by the request by analyzing node data from the data store 4.1. This amount of income can be included when formulating 2.0.3 the response.

If the request is not attempting to retrieve tax-related data, the application programming interface 2.0 may check 2.2.17 whether the request is attempting to retrieve routing data. If so, the application programming interface 2.0 can retrieve 2.2.18 routing data from relevant data sources 4.0, e.g., routing models 4.2, profitability data 4.3, an additional input 4.4 to the node 1.0, or data on pool availability 4.5, which is included or used when formulating 2.0.3 the response.

If the request is not attempting to retrieve routing data, the application programming interface 2.0 may check 2.2.19 whether the request is attempting to change routing data. If so, the application programming interface may change 2.2.20 the additional input 4.4 to the node 1.0, then publish 2.2.6 the change by way of a message (on a topic based on what kind of change is being made) to the message queue server 3.0. When the message queue server 3.0 receives the message, the message queue server 3.0 may send the message to all parties subscribed to the topic (e.g., the node 1.0).

If the application programming interface 2.0 cannot discern what the request is attempting to accomplish, the application programming interface 2.0 can reject 2.0.2 the request.

Figure 3:
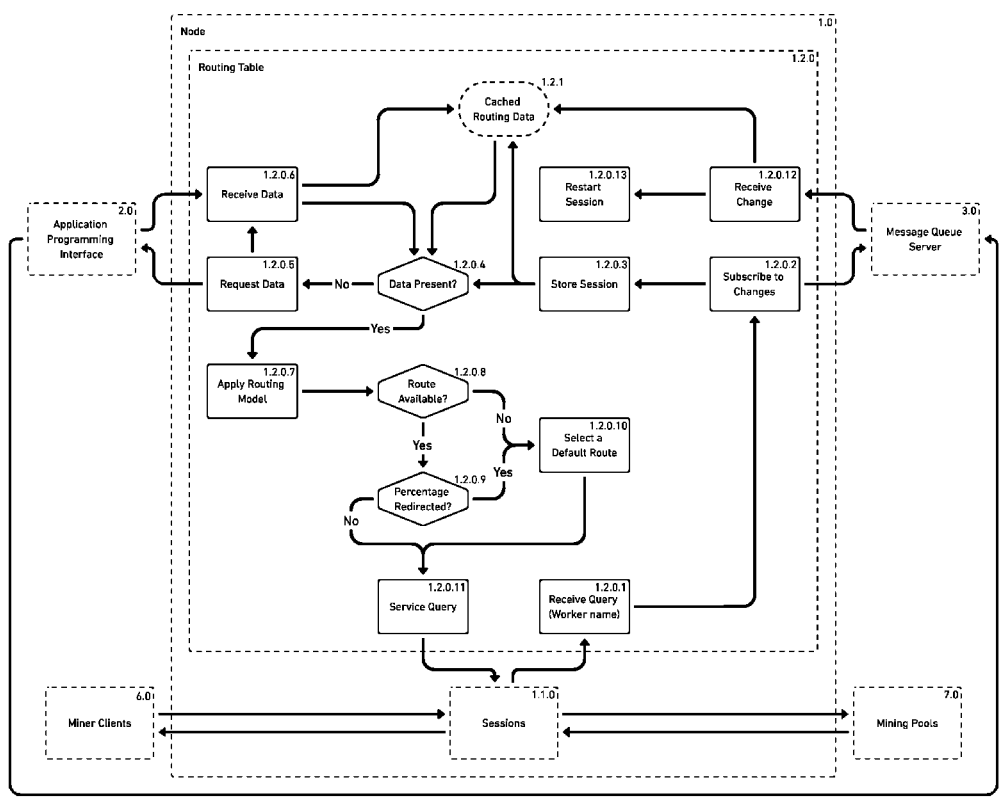
FIG. 3 is a schematic illustration pertaining to a routing table of an embodiment.

FIG. 3 schematically illustrates a routing table 1.2.0 that can, but need not, be used to carry out certain embodiments, such as that in FIG. 1, herein showing greater detail of one way a routing table 1.2.0 might be implemented and how the routing table 1.2.0 interacts with the other elements of various embodiments. The routing table 1.2.0 can implement logic that determines a mining pool 7.0 to which the node 1.0 represents a miner client 6.0, identified, for example, by a worker name.

The worker name is a sequence of characters (letters, numbers, symbols, etc.) which identifies the miner client 6.0. The worker name need not be unique (although worker names are more useful when they uniquely identify the miner client 6.0). Worker names are chosen by an owner of the miner client 6.0, an operator of the miner client 6.0, a manager of the miner client 6.0, or a user account operator 8.0, and may have any semantic meaning; e.g., the worker names may be a sequential enumeration of several miner clients 6.0 (e.g. "miner-001"), static Internet Protocol addresses of each of several miner clients 6.0 (e.g. "192.168.1.0"); or identifiable physical locations of several miner clients 6.0 within one or more facilities (e.g. "facility-01-aisle-07-rack-15-row-11-column-03"). The worker names may alternatively have no semantic meaning, e.g., "Velma."

In some, but not all, embodiments, the node 1.0 may enforce certain requirements for worker names. For instance, the node 1.0 may require that a worker name be prefixed by a username of the user account operator 8.0 followed by a dot character ("."), or that the worker name be unique, or both.

When the miner client 6.0 connects to the node 1.0, a session 1.1.0 is created to handle communications with the miner client 6.0 and with the mining pool 7.0. In some embodiments, the session 1.1.0 may route new packet communications based on those packet communications received from the miner client 6.0 to more than one mining pool 7.0, perhaps depending on a routing model implemented by the routing table 1.2 or by the application programming interface 2.0.

When the session 1.1.0 discovers the worker name of the miner client 6.0, for such an embodiment, the session 1.1.0 issues a query against the routing table 1.2.0 in order to determine to which mining pool 7.0 to which the session 1.1.0 should represent the miner client 6.0. When the routing table 1.2.0 receives the query (e.g., the worker name) from the session 1.1.0, the routing table 1.2.0 performs a number of operations or queries against entities external to the node 1.0 (e.g. the application programming interface 2.0 or the message queue server 3.0). In some embodiments, the routing table 1.2.0 may, for any query received, offload the decision of to which mining pool 7.0 the session 1.1.0 should connect to another entity such as the application programming interface 2.0. In other words, the routing table 1.2.0 may, in some embodiments, itself not implement any routing logic, instead delegating logical routing to another entity such as the application programming interface 2.0.

In the embodiment illustrated in FIG. 3, however, the routing table caches relevant data in a routing data cache 1.2.1 so that can service some queries without making a request to the application programming interface 2.0. What data, if any, the routing table 1.2.0 requires to be stored in the routing data cache 1.2.1 depends on which programmatic routing models 4.2.0 (see FIG. 1) the particular embodiment of the routing table 1.2.0 implements, if any. To ensure that the data in the routing data cache 1.2.1 remains up-to-date, the routing table 1.2.0 may make use of the message queue server 3.0 to subscribe 1.2.0.2 to live updates pertaining to a topic based on the worker name provided by the session 1.1.0. In some embodiments, the routing table 1.2.0 may store 1.2.0.3 a session identifier in the routing data cache 1.2.1 so that the routing table 1.2.0 may notify the session 1.1.0 upon receipt of a message from the message queue server 3.0 indicating that the packet communications of miner client 6.0 should be routed to a different mining pool 7.0. In some embodiments, the routing table 1.2.0 may, upon receiving such a message, instead simply destroy the session 1.1.0 identified by the session identifier, causing a new session to be created at a subsequent occurrence of the miner client 6.0 connecting to the node 1.0.

In the embodiment of the routing table 1.2.0 depicted in FIG. 3, if 1.2.0.4 the routing data cache 1.2.1 does not contain sufficient data to service the query, the routing table 1.2.0 can request 1.2.0.5 additional routing data from the application programming interface 2.0 (or, in other embodiments, from another source, such as the variety of data sources 4.0 directly). Upon receipt 1.2.0.6, the data is stored in the routing data cache 1.2.1. When the routing data cache 1.2.1 contains sufficient data to service the query, the routing table 1.2.0 applies 1.2.0.7, if necessary or so desired, a programmatic routing model 4.2.0 (or a coordinated combination of several programmatic routing models) to select a mining pool 7.0 (or multiple mining pools 7.0). If no mining pool 7.0 is available (as determined by the routing model, if present, by data stored in the routing data cache 1.2.1, or both), the routing table may select 1.2.0.10 a default mining pool 7.0 for the session 1.1.0 to use (in another embodiment, the routing table 1.2.0 may instead select no mining pool 7.0 for the session 1.1.0, causing, for example, termination of communications of the session 1.1.0 with the miner client 6.0). In some embodiments of the routing table 1.2.0 (such as the one depicted in FIG. 3), the routing table may be configured to redirect 1.2.0.9 a percentage of the work done by the miner client 6.0 to at least one default mining pool 7.0, regardless of whether an appropriate mining pool 7.0 was determined to be available. In some embodiments, this behavior may be controlled entirely by way of periodic messages sent to the message queue server 3.0 and delivered to the node 1.0 instructing the node 1.0 to redirect packet communications of the miner client 6.0 to the default mining pool 7.0, or to a mining pool 7.0 determined by other means. In other embodiments, the session 1.1.0 may be configured to itself manage redirecting a percentage of work done by the miner client 6.0 to the default mining pool 7.0.

After determining a mining pool 7.0 (or more than one mining pool 7.0) to which to direct packet communications from the miner client 6.0, the routing table 1.2.0 services 1.2.0.11 the query, yielding the mining pool 7.0 or mining pools 7.0 to the session 1.1.0.

Figure 8:
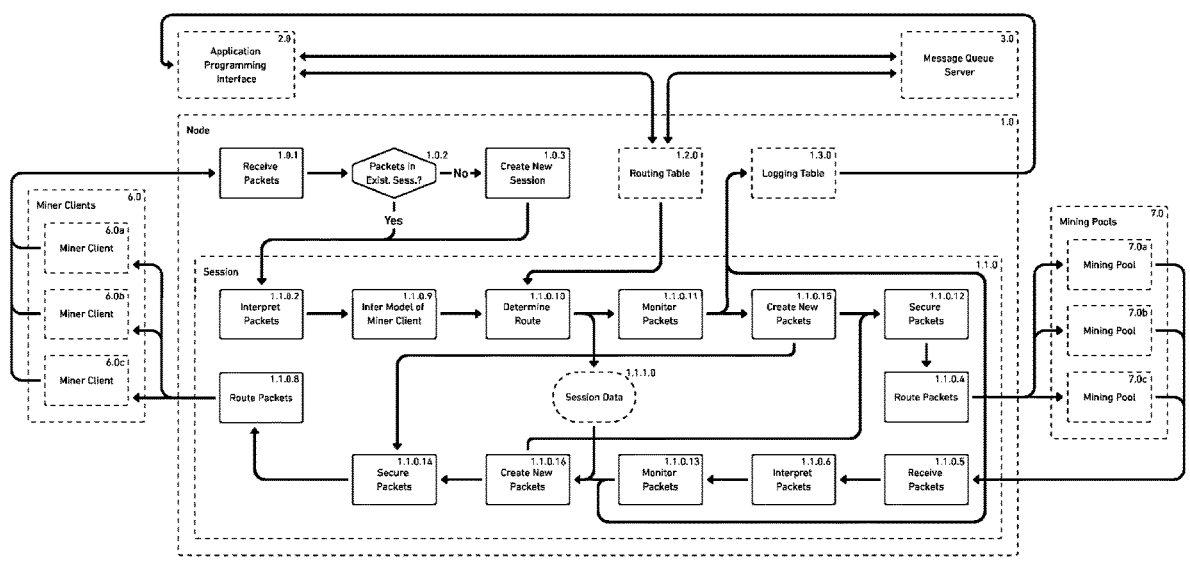
FIG. 8 is a schematic illustration pertaining to a node of an embodiment.

In some embodiments, like the embodiments illustrated in FIGS. 1 and 8, the node 1.0 uses the routing table 1.2.0 when determining a mining pool 7.0 to which to transmit packet communications representing the miner client 6.0, and not vice versa. In these embodiments, packet communications representing the mining pool 7.0 are transmitted back to the same miner client 6.0 that initiated the session 1.1.0 that connected to the mining pool 7.0.

However, in another embodiment, the node 1.0 may use the routing table 1.2.0 to additionally determine a miner client 6.0 to which to transmit packet communications representing the mining pool 7.0 on a case-by-case basis for each discrete unit of packet communications. This feature may be included to allow the node 1.0 to multiplex communications between several miner clients 6.0 and several mining pools 7.0; to share work orders from a mining pool 7.0 between several miner clients 6.0; or to determine and carry out the most optimal distribution of work orders between several miner clients 6.0 and one or more mining pools 7.0.

Figure 4:
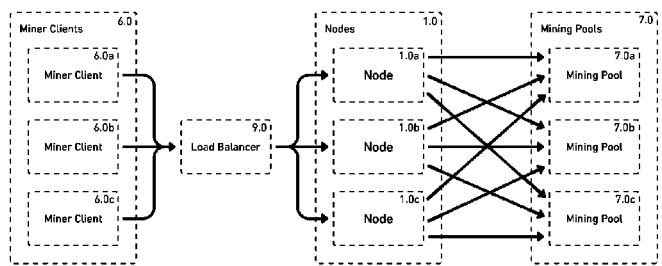
FIG. 4 is a schematic illustration pertaining to a load balancer of an embodiment.

FIG. 4 schematically illustrates how a load balancer 9.0 might be used to distribute connections from even a large number of miner clients 7.0 among several nodes 1.0 (e.g. a first node 1.0*a*, a second node 1.0*b*, or a third node 1.0*c*). In this configuration, the large number of miner clients 7.0 connect first to the load balancer 9.0, which redirects the connection to one of the nodes 1.0. Any of the nodes 1.0 may still intermediate between any of the miner clients 6.0 and any of the mining pools 7.0. In some embodiments, session data (including subscription identifiers: see FIG. 8) pertaining to a miner client 6.0 connecting to a node, e.g. 1.0*a*, may be accessible to each other node 1.0, so that each other node 1.0 may handle subsequent sessions from the miner client 6.0 smoothly.

Figure 5:
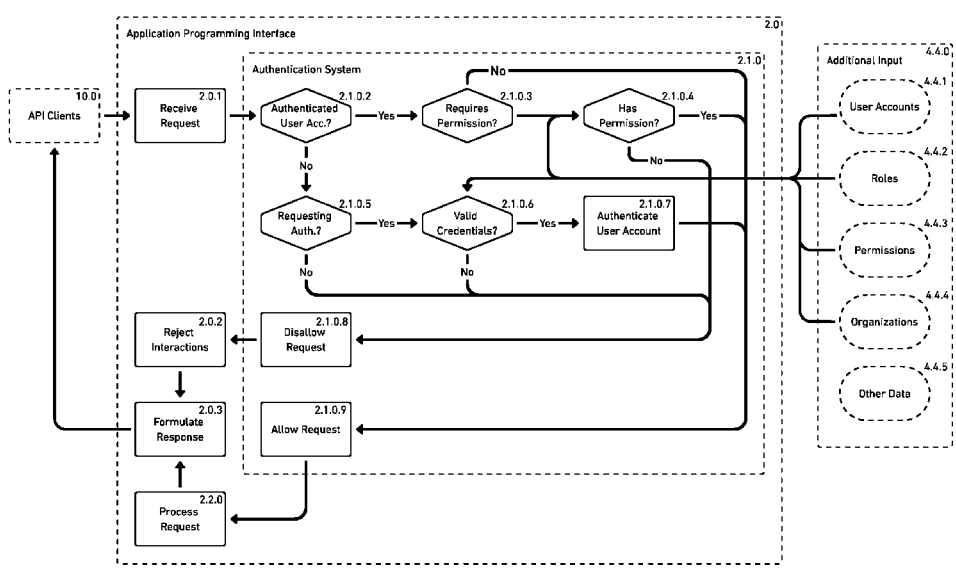
FIG. 5 is a schematic illustration pertaining to an authentication system.

FIG. 5 schematically illustrates an authentication system 2.1.0, of the sort that may be used if so desired, to gatekeep requests of the application programming interface 2.0. Illustratively in connection with FIGS. 1 and 2, one possible embodiment of the authentication system 2.1.0 of the application programming interface 2.0 is detailed with respect to FIG. 1 or FIG. 2. The authentication system 2.1.0 may recognize user accounts, organizations, roles, and permissions. Application programming interface clients 10.0 initiate requests with the application programming interface 2.0. When the application programming interface 2.0 receives 2.0.1 a request, the application programming interface 2.0 passes the request into the authentication system 2.1.0, which will ultimately either allow 2.1.0.9 or disallow 2.1.0.8 the request. First, the authentication system checks 2.1.0.2 whether the request is associated with an authenticated user account. If the request is not associated with an authenticated user account, the authentication system checks 2.1.0.5 whether the request is requesting authorization from the application programming interface 2.0. If the request is not requesting authorization from the application programming interface 2.0, the authentication immediately disallows 2.1.0.8 the request. If the request is not associated with an authenticated user account but the request is requesting authorization from the application programming interface 2.0, then the authentication system 2.1.0 checks 2.1.0.6 whether the request contains valid credentials to authenticate. If the request does not contain valid credentials to authenticate, the authentication system 2.1.0 disallows 2.1.0.8 the request. If the request does contain valid credentials, the authentication system 2.1.0 authenticates 2.1.0.7 a user account associated with the credentials, then allows 2.1.0.9 the request. If the authentication system 2.1.0 found 2.1.0.2 the request to be associated with an authenticated user account, the authentication system 2.1.0 checks 2.1.0.3 whether the request requires a specific permission recognized by the authentication system 2.1.0. If the request does not require any permissions, the authentication system 2.1.0 allows the request. If the request does require a specific permission, the authentication system 2.1.0 checks 2.1.0.4 whether the authenticated user account has the permission required. In particular, the authentication system 2.1.0 checks whether, for any organization to which the request pertains, the authenticated user account belongs to the organization and whether a role assigned to the authenticated user by the organization has the required permission. If the authenticated user account has the specific permission required, the authentication system 2.1.0 allows the request. Otherwise, the authentication system 2.1.0 disallows 2.1.0.8 the request. The authentication system 2.1.0 can use an additional input 4.4.0 containing information about user accounts 4.4.1, information about organizations 4.4.4 of which a user account may be a member, information about roles 4.4.2 that a user account may take on within an organization, information about permissions 4.4.3 that a role might have, and other data 4.4.5 to gatekeep the request. When the authentication system 2.1.0 disallows 2.1.0.8 the request, the application programming interface 2.0 rejects 2.0.2 the request, then formulates 2.0.3 a response. When the authentication system 2.1.0 allows 2.1.0.9 the request, the request is processed 2.2.0 and a response formulated 2.0.3. Whether the request is disallowed 2.1.0.8 or allowed 2.1.0.9 by the authentication system 2.1.0, the response formulated 2.0.3 by the application programming interface 2.0 is sent to the application programming interface client 10.0.

Figure 6:
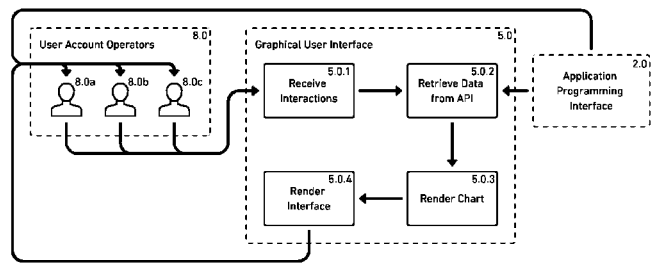
FIG. 6 is a schematic illustration pertaining to a graphical user interface.

FIG. 6 schematically illustrates one of the many graphical user interfaces 5.0 that can be used in connection with embodiments herein. As illustratively used in connection with FIG. 1, FIG. 6 schematically illustrates one embodiment of the graphical user interface 5.0 in greater detail than in the previous figures. When the graphical user interface 5.0 receives 5.0.1 an interaction from a user account operator 8.0 (e.g., a first user account operator 8.0*a*, a second user account operator 8.0*b*, or a third user account operator 8.0*c*), the graphical user interface 5.0 first retrieves 5.0.2 any data necessary from the application programming interface 2.0 that is necessary to process the interaction. When the graphical user interface 5.0 receives the data from the application programming interface 2.0, the graphical user interface 5.0 may render 5.0.3 a chart illustrating some or all of the data. The graphical user interface 5.0 then renders 5.0.4 the interface to be displayed to the user account operator 8.0.

Figure 7:
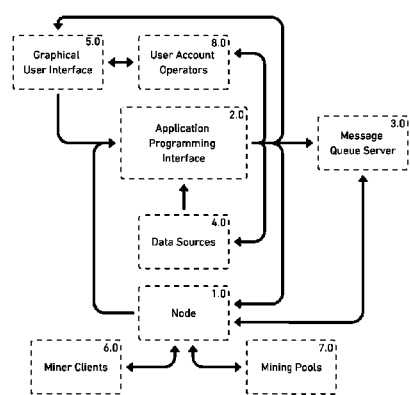
FIG. 7 is another schematic illustration of an embodiment.

FIG. 7 schematically illustrates one embodiment at a high level. A node or nodes 1.0 intermediates packet communications between miner clients 6.0 and mining pools 7.0. The node 1.0 communicates with an application programming interface 2.0 and a message queue server 3.0. User account operators 8.0 interact with a graphical user interface 5.0, which in turn interacts with the application programming interface 2.0. The application programming interface 2.0 reads data from several data sources 4.0 and writes data back to the data sources 4.0.

FIG. 8 schematically illustrates the node 1.0 in one embodiment, as depicted in FIG. 1, in greater detail. When the node 1.0 receives 1.0.1 packet communications from a miner client 6.0 (e.g., a first miner client 6.0*a*, a second miner client 6.0*b*, or a third miner client 6.0*c*), the node 1.0 checks 1.0.2 whether the packet communications belong to an existing session 1.1.0. If so, the node 1.0 allows the existing session 1.1.0 to handle the packet communications. If the packets do not belong to an existing session 1.1.0, the node 1.0 creates 1.0.3 a new session 1.1.0 to handle the packet communications. When the session 1.1.0 receives packet communications, the node 1.0 interprets 1.1.0.2 them to produce interpreted packet communications. In some embodiments of the node 1.0, the session then infers 1.1.0.9 a model of the miner client 6.0. Next, the session 1.1.0 selects a mining pool 7.0 (e.g., a first mining pool 7.0*a*, a second mining pool 7.0*b*, or a third mining pool 7.0*c*) to which the node 1.0 may represent the miner client 6.0. To do so, the node 1.0 issues a request to the routing table 1.2.0, which may request data from an application programming interface 2.0 or receive live updates from a message queue server 3.0 (see FIG. 3), or in another embodiment, access a variety of data sources 4.0 directly. This mining pool 7.0 is stored in the session data 1.1.1.0 associated with the session. Next, the session 1.1.0 may monitor 1.1.0.11 the packet communications, storing any information produced in a logging table 1.3.0, in some embodiments, if desired; stored directly in the data store 4.1; or sent to the application programming interface 2.0. When monitoring 1.1.0.11 the packet communications, the node 1.1, or in other embodiments, another entity, may use the interpreted packet communications to determine liveliness and performance of the miner client 6.0, and report the liveliness and performance to any of an owner of the miner client 6.0, an operator of the miner client 6.0, and a manager of the miner client 6.0. The logging table 1.3.0 asynchronously pushes this data to the application programming interface 2.0. The session then creates 1.1.0.15 new packet communications based on the interpreted packet communications received 1.0.1 from the miner client 6.0. After creating 1.1.0.15 the new packet communications, the session 1.1.0 may secure 1.1.0.12 the new packet communications, either by encrypting them or by using other cryptographic methods to prevent a malicious actor from reading the new packet communications, or to prevent the malicious actor from tampering with the new packet communications, or both. In some embodiments, the new packet communications are secured without encrypting them. Next, the session establishes a connection to the mining pool 7.0 (if one is not already established in the session 1.1.0), then routes 1.1.0.4 the new packet communications to the mining pool 7.0.

Subsequently, when the session 1.1.0 receives 1.1.0.5 other packet communications from the mining pool 7.0, the session 1.1.0 interprets 1.1.0.6 the other packet communications to produce other interpreted packet communications. The session 1.1.0 then monitors 1.1.0.13 the packet communications, storing any derived data in the logging table

1.3.0. The session then produces 1.1.0.16 other new packet communications based on the other interpreted packet communications. The session 1.1.0 may then secure 1.1.0.14 the other new packet communications either by encrypting them or using other cryptographic methods to prevent a malicious actor from reading the other new packet communications, or to prevent the malicious actor from tampering with the other new packet communications, or both. In some embodiments, the other new packet communications are secured without encrypting them. Finally, the session 1.1.0 routes 1.1.0.8 the other new packet communications back to the miner client 6.0.

Figure 9:
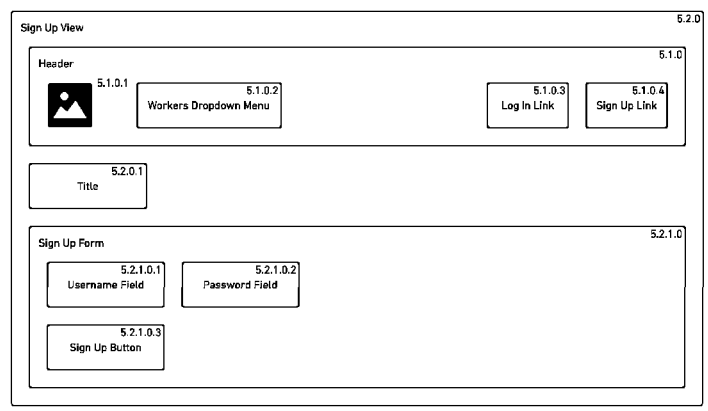
FIG. 9 is a schematic illustration pertaining to a sign up view of an embodiment.

FIG. 9 graphically shows a sign up view 5.2.0 of one embodiment of the graphical user interface 5.0, which may be included, but is not required. In this embodiment of the graphical user interface 5.0, a header 5.1.0 appears at the top of each view. Contained within the header 5.1.0.1 are a logo 5.1.0.1 and a number of links and dropdown menus (e.g., the one dropdown menu 5.1.0.2 reading "Workers" shown in FIG. 9). Additionally, the header 5.1.0 contains links pertaining to user account authentication and creation. In particular, if a user account is authenticated, a log out link 5.1.0.6 is included in the header 5.1.0. If no user account is authenticated with the graphical user interface 5.0, a log in link 5.1.0.3 and a sign up link 5.1.0.4 are included. Other embodiments of the header 5.1.0 may include any other user interface elements. When the log in link 5.1.0.3 is clicked, the graphical user interface 5.0 transitions to the log in view 5.3.0 (see FIG. 10). When the sign up link 5.1.0.4 is clicked, the graphical user interface 5.0 transitions to the sign up view 5.2.0. When the log out link 5.1.0.6 is clicked, the graphical user interface de-authenticates the authenticated user account by way of a request of the application programming interface 2.0 and transitions to the log in view 5.3.0.

The embodiment of the sign up view 5.2.0 depicted in FIG. 9 also contains a title 5.2.0.1 reading "Sign Up," as well as a sign up form 5.2.1.0. The sign up form 5.2.1.0 contains whatever inputs necessary to gain information to create a user account recognizable by the authentication system 2.1.0 of the application programming interface 2.0 (see FIG. 5). In the depicted embodiment, the sign up form 5.2.1.0 contains a username field 5.2.1.0.1, a password field 5.2.1.0.2, and a sign up button 5.2.1.0.3. Other embodiments of the sign up form 5.2.1.0 may use an email field in lieu of the username field 5.2.1.0.1, and if so, may not include the password field 5.2.1.0.2. When the sign up button 5.2.1.0.3 is clicked, the graphical user interface 5.0 initiates an request of the application programming interface 2.0 to create a new user account (this request is one that changes 2.2.19 routing data; see FIG. 2). If the request is rejected for any reason (for instance, a user account may already exist with a provided username), an error may appear in the view.

Figure 10:
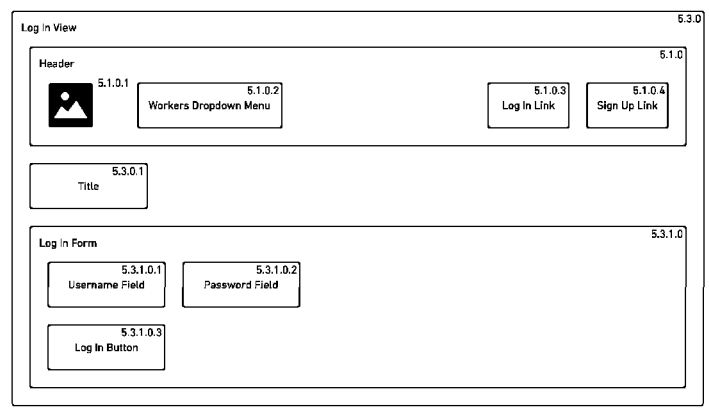
FIG. 10 is a schematic illustration pertaining to a log in view of an embodiment.

FIG. 10 graphically shows a sign in view 5.3.0 of one embodiment of the graphical user interface 5.0, which may be included, but is not required. In this embodiment of the sign in view 5.3.0, the header appears at the top of the view, as in the sign up view 5.2.0. The log in view 5.2.0 also contains a title 5.3.0.1 reading "Log In," as well as a log in form 5.3.1.0. The log in form 5.3.1.0 contains whatever inputs necessary to gain information to authenticate a user account recognizable by the authentication system 2.1.0 of the application programming interface 2.0 (see FIG. 5). In this embodiment, the log in form 5.3.1.0 contains a username field 5.3.1.0.1, a password field 5.3.1.0.2, and a log in button 5.3.1.0.3. When the log in button 5.3.1.0.3 is clicked, the graphical user interface 5.0 initiates a request of the application programming interface 2.0 to authenticate a user account identified by a username inputted into the username field 5.3.1.0.1 (this request is one that changes 2.2.19 routing data; see FIG. 2). If the request is rejected for any reason (e.g., a password inputted into the password field 5.3.1.0.2 is incorrect for the user account identified by the username inputted into the username field 5.3.1.0.1), an error may appear in the view.

Figure 11:
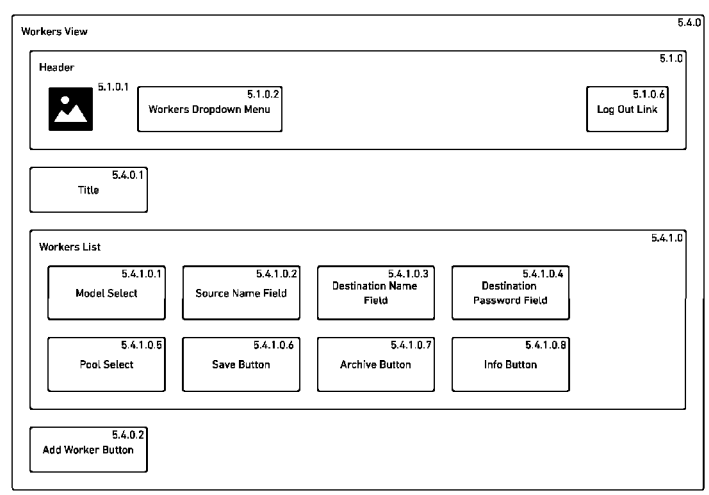
FIG. 11 is a schematic illustration of a workers view of an embodiment.

FIG. 11 graphically shows a workers view 5.4.0 of one embodiment of the graphical user interface 5.0, which may be included, but is not required. In the embodiment of the graphical user interface 5.0 depicted in FIG. 11, a user account must be authenticated in order to access the workers view 5.4.0. The header 5.1.0 appears at the top of the workers view 5.4.0. The workers view contains a title 5.4.0.1 reading "Workers," a list of workers 5.4.1.0, and an add worker button 5.4.0.2. The list of workers 5.4.1.0 displays information that can be edited by an operator of the authenticated user account. In the embodiment shown in FIG. 11, for each worker, there is a miner model field 5.4.1.0.1, a source worker name field 5.4.1.0.2, a destination worker name field 5.4.1.0.3, a destination worker password field 5.4.1.0.4, and a mining pool selection field 5.4.1.0.5. Additionally, for each worker, there is a save button 5.4.1.0.6, an archive button 5.4.1.0.7, an info button 5.4.1.0.8, and a cancel button (not pictured).

In embodiments like the one shown in FIG. 11, a user account operator 8.0 simply has control over to which mining pool 7.0 the packet communications of each miner client 6.0 are transmitted. However, in other embodiments, the user account operator 8.0 may have much more fine-grained and complex control over configuration of each miner client 6.0. In some embodiments, the user account operator 8.0 may be able to select different mining pools 7.0 for different time periods in advance, select from a number of programmatic routing models 4.2.0 to use for each miner client 6.0, select percentages of time to mine for different mining pools 7.0, etc.

When the add worker button 5.4.0.2 is clicked, a new worker is added to the list of workers 5.4.1.0. When the save button 5.4.1.0.6 is clicked, the graphical user interface 5.0 initiates a request of the application programming interface 5.0 to save the worker (this request is one that changes 2.2.19 routing data; see FIG. 2). When a new worker is added and saved, the cancel button is hidden, replaced by the archive button 5.4.1.0.7. If the cancel button is pressed (before the worker is saved), the worker is removed from the list of workers without being saved. When the worker is saved, the info button 5.4.1.0.8 is enabled. If the info button 5.4.1.0.8 is enabled and is clicked, the graphical user interface 5.0 transitions to the worker detail view 5.5.0 (see FIG. 12). When the archive button 5.4.1.0.7 is clicked, the worker is removed from the list of workers, and the graphical user interface 5.0 initiates a request of the application programming interface 2.0 to effect the removal.

Figure 12:
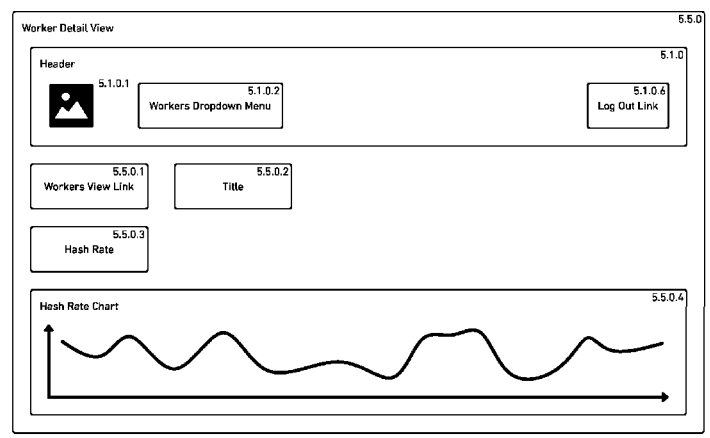
FIG. 12 is a schematic illustration of a worker detail view of an embodiment.

FIG. 12 graphically shows a worker detail view 5.5.0 of one embodiment of the graphical user interface 5.0, which may be included, but is not required. The header 5.1.0 appears at the top of the worker detail view 5.5.0. The worker detail view 5.5.0 contains a link to the workers view 5.4.0, as well as a title 5.5.0.2 displaying the source worker name of the worker being detailed by the worker detail view 5.5.0. In the embodiment of the worker detail view 5.5.0 depicted in FIG. 12, the worker detail view 5.5.0 shows the hash rate 5.5.0.3 of the worker over some period of time (in this case, over 24 hours), as well as a chart 5.5.0.4 showing the hash rate of the worker over a period of time (in this case, also 24 hours). Because embodiments herein can be configured to access the exact information the mining pool 7.0 uses when the mining pool 7.0 computes a hash rate of a miner client 6.0, embodiments herein can easily compare the value reported by the mining pool 7.0 against the value the embodiment (and therefore also the pool) computes, thereby determining veracity of the reporting of the mining pool.

The worker detail view 5.5.0 may show any other data available about the worker, and may also include inputs to edit metadata about the worker, including but not limited to the model of the worker, the source worker name, the destination worker name, the destination worker password, the destination worker mining pool, and a programmatic routing model to be used for the worker.

Figure 13:
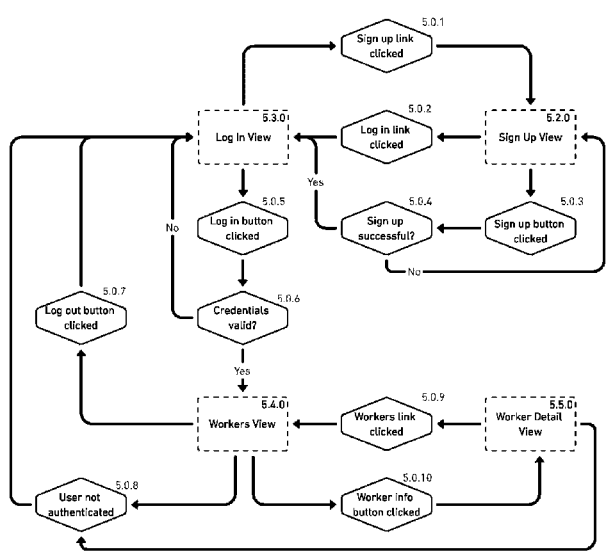
FIG. 13 is another schematic illustration pertaining to a graphical user interface.

FIG. 13 schematically shows, in one embodiment, transitions between the graphical user interface views (the sign up view 5.2.0, the sign in view 5.3.0 the workers view 5.4.0, and the worker detail view 5.5.0). On the sign up view 5.2.0, when the sign up button is clicked 5.0.3, and if 5.0.4 a request of the application programming interface 2.0 to create a new user account is successful, the graphical user interface 5.0 transitions to the log in view 5.3.0. When the sign up button is clicked 5.0.3, but the request of the application programming interface 2.0 fails for any reason, the graphical user interface 5.0 remains on the sign up view 5.2.0 (and may display an error indicating the reason for failure). When the log in link is clicked 5.0.2, the graphical user interface 5.0 transitions to the log in view 5.3.0.

On the log in view 5.3.0, when the sign up link is clicked 5.0.1, the graphical user interface 5.0 transitions to the sign up view 5.2.0. When the log in button is clicked 5.0.5, if a request of the application programming interface 2.0 to authenticate a user account succeeds, the graphical user interface transitions 5.0 transitions to the workers view 5.4.0. If the request of the application programming interface 2.0 fails (e.g. because credentials provided were incorrect), the graphical user interface 5.0 remains on the log in view 5.3.0 (and may display an error indicating the reason for failure).

On the workers view 5.4.0, if 5.0.8 no user account is authenticated, the graphical user interface 5.0 transitions to the log in view 5.3.0. If the log out button is clicked 5.0.7, the graphical user interface 5.0 issues a request of the application programming interface 2.0 to deauthenticate a user account that was previously authenticated and transitions to the log in view 5.3.0. If a worker info button is clicked 5.0.10, the graphical user interface 5.0 transitions to the worker detail view 5.5.0.

On the worker detail view 5.5.0, if 5.0.8 no user account is authenticated, the graphical user interface transitions to the log in view 5.3.0. If the workers link is clicked 5.0.9, the graphical user interface 5.0 transitions to the workers view 5.4.0.

Figure 14:
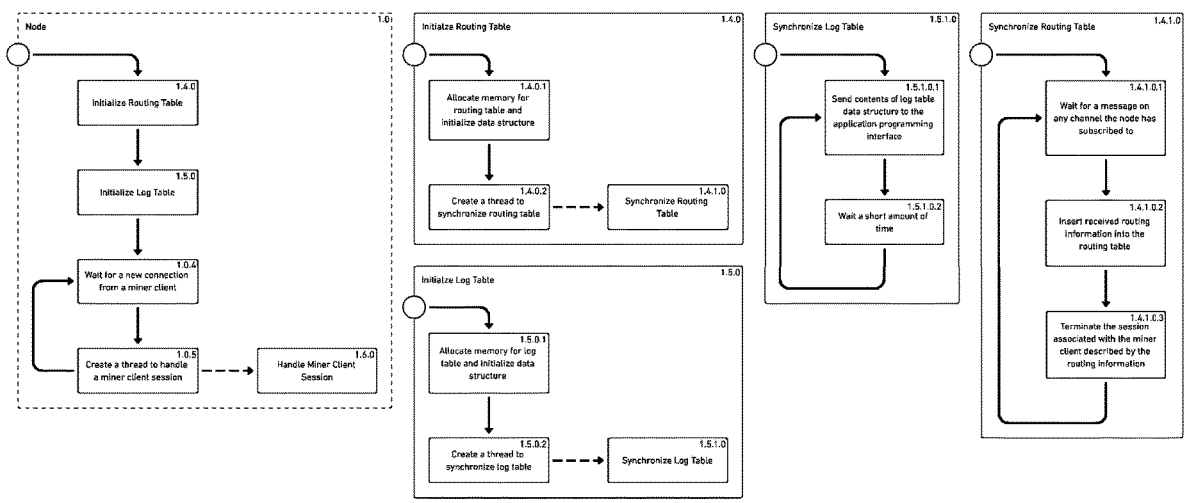
FIG. 14 is another schematic illustration pertaining to a node of an embodiment.

FIG. 14 schematically shows, in one embodiment, the logic of the node 1.0. When the node 1.0 starts, it first initializes 1.4.0 the routing table and initializes 1.5.0 the log table. Then, the node 1.0 waits 1.0.4 for a new connection from a miner client 6.0. When a miner client 6.0 connects to the node 1.0, the node 1.0 creates 1.0.5 a new thread of execution to handle 1.6.0 a session 1.1.0 for the miner client 6.0.

When initializing 1.4.0 the routing table 1.2.0, the node 1.0 allocates 1.4.0.1 memory for the cached routing data 1.2.1 of the routing table 1.2.0. Then, the node 1.0 creates 1.4.0.2 a new thread of execution to synchronize 1.4.1.0 the routing table 1.2.0.

When synchronizing 1.4.1.0 the routing table 1.2.0, the routing table 1.2.0 waits 1.4.1.0.1 for a message from the message queue server 3.0 on any topic to which the node 1.0 has subscribed. Then, the node 1.0 inserts 1.4.1.0.2 routing data contained in the message into the routing data cache 1.2.1 and terminates 1.4.1.0.3 the session 1.1.0 associated with a miner client 6.0 affected by the routing data.

When initializing 1.5.0 the log table 1.3.0, the node 1.0 allocates 1.5.0.1 memory for the log table to store data. Then, the node 1.0 creates 1.5.0.2 a new thread of execution to synchronize 1.5.1.0 the log table.

When synchronizing 1.5.1.0 the log table 1.3.0, the log table 1.3.0 sends 1.5.1.0.1 previously-received data to the application programming interface 2.0, then waits 1.5.1.0.2 a short amount of time before repeating.

Figure 15:
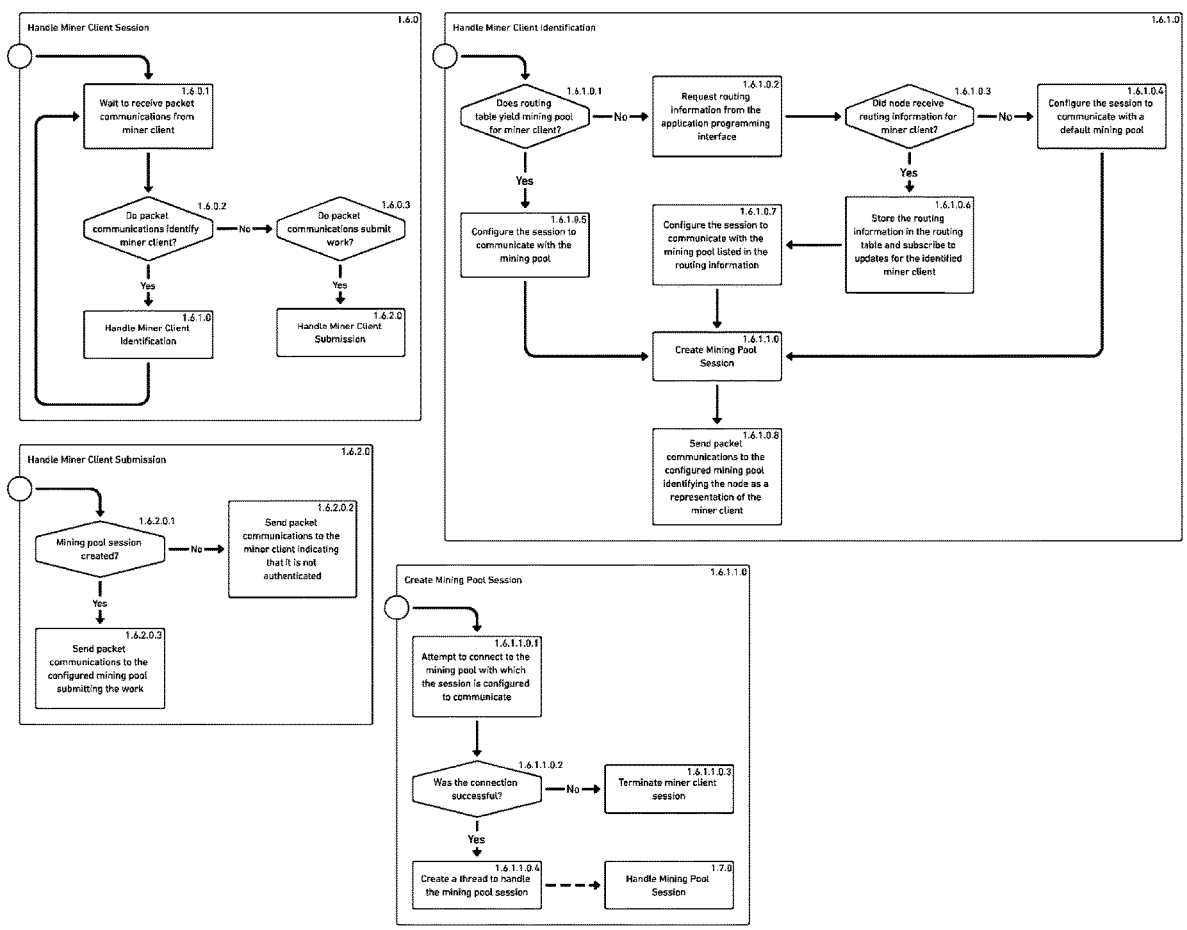
FIG. 15 is another schematic illustration pertaining to a node of an embodiment.

FIG. 15 schematically illustrates logic by which the session 1.1.0 operates when receiving packet communications from a miner client 6.0. When the session 1.1.0 operates 1.6.0, the node 1.0 first waits 1.6.0.1 to receive packet communications from a miner client 6.0. When the node 1.0 receives the packet communications, if 1.6.0.2 the packet communications identify the miner client 6.0, the session 1.1.0 handles 1.6.1.0 the miner client identification. If 1.6.0.3 the packet communications do not identify the miner, but submit work, the session 1.1.0 handles 1.6.2.0 submission.

When handling 1.6.1.0 miner client identification, the session 1.1.0 checks 1.6.1.0.1 if the routing table 1.2.0 yields a mining pool 7.0 for the miner client 6.0. If so, the session 1.1.0 is configured 1.6.1.0.5 to communicate with the mining pool 7.0. If the routing table does not yield a mining pool 7.0, the session 1.1.0 requests 1.6.1.0.2 routing information from the application programming interface 2.0. If the session 1.1.0 receives routing information for the miner client 6.0, the session 1.1.0 stores 1.6.1.0.6 the routing information in the routing table 1.2.0, and subscribes to updates for the miner client 6.0 by way of a request of the message queue server 3.0. Then the session 1.1.0 is configured 1.6.1.0.7 to use a mining pool 7.0 included in the routing information. If the session 1.1.0 did not receive routing information for the miner client 6.0, the session 1.1.0 is configured 1.6.1.0.4 to use a default mining pool 7.0. Once the session 1.1.0 is configured to use a mining pool 7.0, the session 1.1.0 initiates 1.6.1.1.0 communications with the mining pool 7.0, then sends 1.6.1.0.8 packet communications to the mining pool 7.0 identifying the node 1.0 as a representation of the miner client 6.0.

When initiating 1.6.1.1.0 communications with the mining pool 7.0, the session 1.1.0 first attempts 1.6.1.1.0.1 to connect to the mining pool 7.0. If 1.6.1.1.0.2 the session 1.1.0 was able to connect successfully, the session 1.1.0 creates 1.6.1.1.0.4 a new thread of execution to handle 1.7.0 packet communications received from the mining pool 7.0. If the session 1.1.0 was not able to connect successfully, the session 1.1.0 is terminated 1.6.1.1.0.3.

When handling 1.6.2.0 submission of work from a miner client 6.0, the session 1.1.0 first checks 1.6.2.0.1 to see if a connection has been made to a mining pool 7.0. If not, session 1.1.0 sends 1.6.2.0.2 packet communications to the miner client 6.0 indicating that the miner client 6.0 should identify itself. If the connection to the mining pool 7.0, has been made, the session 1.1.0 sends 1.6.2.0.3 packet communications to the mining pool 7.0 submitting the work.

Figure 16:
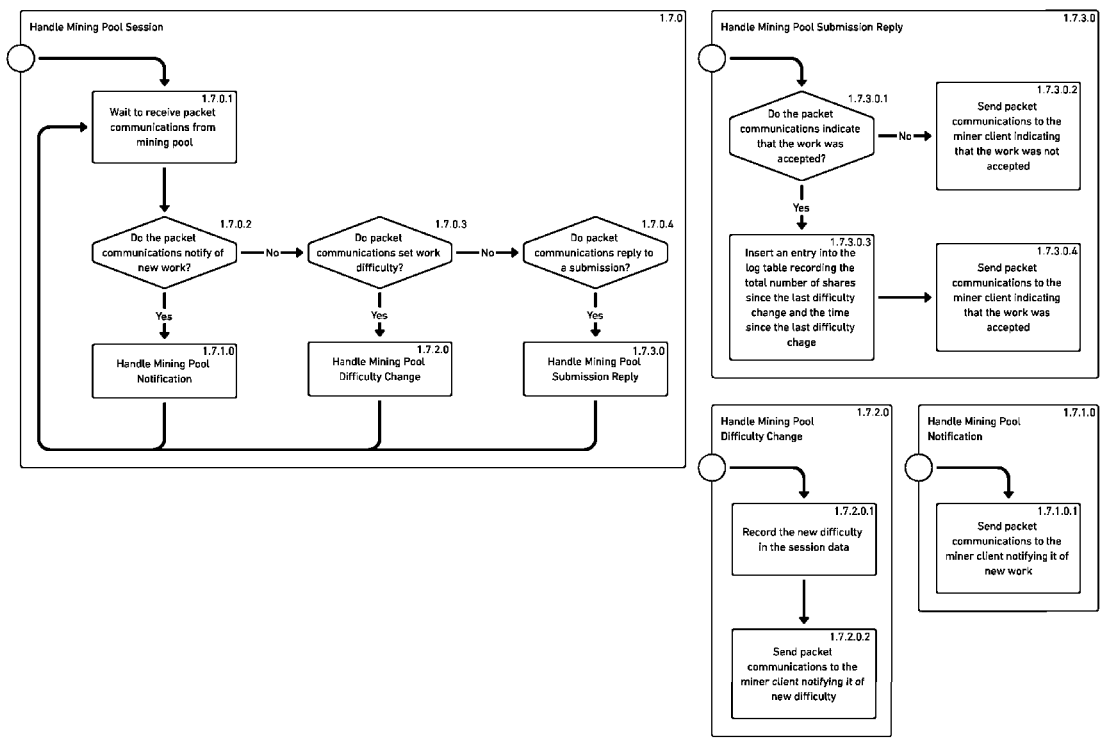
FIG. 16 is another schematic illustration pertaining to a node of an embodiment.

FIG. 16 schematically illustrates logic by which the session 1.1.0 operates 1.7.0 when receiving packet communications from a mining pool 7.0. The session 1.1.0 first waits 1.7.0.1 to receive packet communications from the mining pool 7.0. When the session 1.1.0 receives packet communications from the mining pool 7.0, if 1.7.0.2 the packet communications contain a notification of new work, the session 1.1.0 handles 1.7.1.0 the notification. If 1.7.0.3 the packet communications set a difficulty of work, the session 1.1.0 handles 1.7.2.0 the new work difficulty. If 1.7.0.4 the packet communications are a reply to a submission of work by the miner client 6.0, the session 1.1.0 handles 1.7.3.0 the reply.

When handling 1.7.1.0 a notification of new work by the mining pool 7.0, the session 1.1.0 sends 1.7.1.0.1 packet communications to the miner client 6.0 notifying of the new work.

When handling 1.7.2.0 a new work difficulty, the session 1.1.0 records 1.7.2.0.1 the new difficulty in the session data 1.1.1.0, then sends 1.7.2.0.2 packet communications to the miner client 6.0 setting the new work difficulty.

When handling 1.7.3.0 a reply by the mining pool 7.0 to a submission of work by the miner client 6.0, the session 1.1.0 checks 1.7.3.0.1 if the reply indicates that the mining pool 7.0 accepted the work. If so, the session 1.1.0 inserts 1.7.3.0.3 an entry into the log table 1.3.0 recording a total amount of work submitted by the miner client 6.0 since the session 1.1.0 last received a new work difficulty, then sends 1.7.3.0.4 packet communications to the miner client 6.0 indicating that the work was accepted by the mining pool 7.0. If the reply indicates that the mining pool 7.0 rejected the work, the session 1.1.0 sends 1.7.3.0.2 packet communications to the miner client 6.0 indicating that the work was rejected by the mining pool 7.0.

Figure 17:
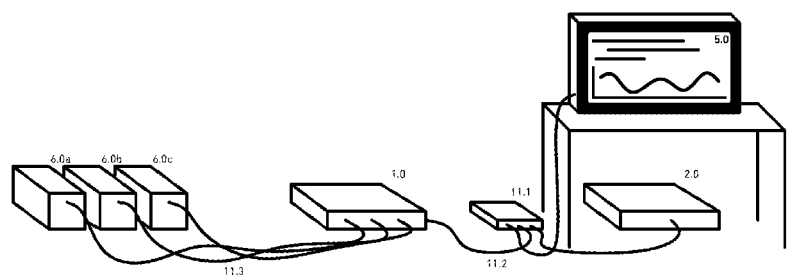
FIG. 17 is an illustration pertaining to hardware devices of an embodiment.

FIG. 17 illustrates an embodiment wherein the node 1.0 is implemented in hardware on a device to which three miner clients 6.0 (a first miner client 6.0*a*, a second miner client 6.0*b*, and a third miner client 6.0*c*) are physically connected; the application programming interface 2.0 is also implemented in hardware, on an other hardware device on the same internal network as the miner clients 6.0 and the node 1.0; and the graphical user interface 5.0 is preloaded to run on an interactive hardware device. When configured in this way, the miner clients 6.0 are connected directly (via cables 11.3) to the node 1.0, decreasing latency and reducing opportunity for man-in-the-middle attacks, and the node 1.0 hardware, the application programming interface 2.0 hardware, and the graphical user interface 5.0 hardware are all connected to a network switch 11.1 via other cables 11.2. The network switch 11.1 connects the node 1.0, the application programming interface 2.0, and the graphical user interface 5.0 to the internet, thereby allowing the node 1.0 to communicate with mining pools 7.0 on other networks and allowing the application programming interface 2.0 to incorporate third-party data accessible on other networks.

Figure 18:
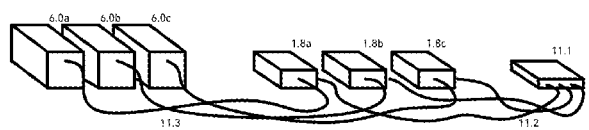
FIG. 18 is another illustration pertaining to hardware devices of an embodiment.

FIG. 18 illustrates an embodiment wherein the packet communications sent by a miner client 6.0 (e.g. a first miner client 6.0*a*, a second miner client 6.0*b*, or a third miner client 6.0*c*) are secured by a hardware security device 1.8 (e.g. a first hardware security device 1.8*a*, a second hardware security device 1.8*b*, or a third hardware security device 1.8*c*) intermediate the miner client 6.0 and a network switch 11.1 (connected using a cable 11.3 and an other cable 11.2). In some embodiments, if the miner client 6.0 sends unencrypted packet communications to a node 1.0, the hardware security device 1.8 may encrypt the packet communications before forwarding them to the node 1.0 via the network switch 11.1. If the node 1.0 sends encrypted packet communications to the miner client 6.0, the hardware security device 1.8 may decrypt the packet communications before forwarding them to the miner client 6.0.

In order to use the apparatus, an owner, operator, or manager of a miner client may configure the miner client to use the node as a mining pool by providing a host name (or public Internet Protocol address) and port number associated with the node. The owner/operator/manager of the miner client may then use the graphical user interface to sign up for a user account recognized by the authentication system and log in. The owner/operator/manager, now a user account operator, may then create a worker and provide a configuration for routing packet communications of the miner client, choosing a worker name for the worker and configuring the miner client to use the worker name when connecting to the node. When the user account operator provides the configuration, the graphical user interface initiates a request of an application programming interface, which effects a change in an additional input that affects how the node routes packet communications. The change is published by the application programming interface such that the change is incorporated by the node in real time. Subsequently, when the miner client connects to the node, the node intermediates packet communications with a mining pool according to the configuration provided by the user account operator. As the miner client communicates with the mining pool by way of the node, the node monitors the packet communications, collecting and storing data in a persistent data store, and making the data available to the user account operator via the graphical user interface.

In embodiments supporting multiple miner clients and mining pools, the user account operator may configure multiple workers via the graphical user interface in a manner similar to that which was described above, choosing distinct names for each worker. Thus, when each miner client under the user account operator's purview connects to the node, the node intermediates packet communications with a mining pool according to the configuration provided for the worker having the name the miner client was configured to use when connecting to the node. Configuring multiple miner clients as described gives the user account operator the ability to manage all the miner clients using one graphical user interface, without having to log in to each miner client individually, even if the miner clients are of different models, are running different firmware, or are made by different manufacturers.

In embodiments of the node supporting intermediation of packet communications between one miner client and multiple mining pools, the user account operator may provide a configuration, for one or more of the miner clients, which instructs the node to do so. Subsequently, when the miner client connects to the node, the node intermediates packet communications between each of the mining pools specified in the configuration, multiplexed according to parameters included in the configuration. This gives the user account operator the ability to configure each miner to automatically switch between multiple mining pools, for example, to carry out profit switching or risk dispersal, without manual intervention.

In embodiments of the node supporting programmatic routing models, the user account operator may configure a worker to abide by one of a number of different programmatic routing models, such as a third-party programmatic routing model, a risk-dispersing routing model, or a routing model that distributes produced cryptocurrency between multiple destination wallets. If the embodiment of the node supports multiple miner clients, the user account operator may configure each of a number of workers to use a different programmatic routing model.

In embodiments of the node supporting multiple mining protocols, the user account operator may configure multiple miner clients, regardless of whether they all use the same mining protocol. In embodiments additionally supporting intermediation of mining protocols, the user account operator may configure a miner client that communicates with a mining protocol to connect, via the node, to a mining pool that communicates with a different mining protocol or a variation of the mining protocol. Doing so may allow the user account operator to connect the miner client to a more profitable mining pool, even if the mining pool uses a different mining protocol from the mining protocol used by the miner client.

In embodiments including an application programming interface, the user account operator may manipulate how the node routes packet communications of the miner clients without using the graphical user interface. This gives the user account operator greater flexibility to manage the miner clients in myriad other ways. For instance, the user account operator may develop computer programs to automatically manage the miner clients; integrate functionality provided by the application programming interface with existing software; develop an alternate graphical user interface; create software that displays data derived from data in the data store by issuing requests of the application programming interface; etc.

In embodiments supporting determination of the accuracy of information reported by the mining pool, the user account operator may be notified (by email, text message, etc., or by a notification presented on the graphical user interface) if the mining pool is reporting lower performance of the miner client than is apparent to the node. If the mining pool underreports the miner client's efficiency, the mining pool may be able to get away with paying the user account operator less than promised for the amount of work actually performed. However, if the mining pool's dishonesty is made known to the user account operator, the user account operator can reconfigure the worker associated with the miner client to connect to a different, more trustworthy, mining pool.

In embodiments supporting alerts, the user account operator may configure a rule set which determines when an alert is sent. For instance, the user account operator may configure to be notified if any miner client's hash rate drops by more than some percentage; if a miner client becomes unresponsive; etc. This allows the user account operator to be aware of the performance of the miner clients without having to constantly check the graphical user interface.

In embodiments supporting inference of a model of the miner client, a user account operator may keep better track of the miner clients based on the model of each miner client without having to enter the models manually. If the embodiment supports comparing performance of the miner client to the theoretical performance of the miner client, the user account operator may be notified if the miner client is not performing as well as possible, in some embodiments including a warning that the miner client may be damaged or configured improperly, or in other embodiments including a suggestion to use a different model of miner client that performs better or is more profitable.

In embodiments of the authentication system recognizing user accounts, organizations, roles, and permissions, a manager of an organization may register the organization with the application programming interface, add user accounts of employees to the organization, create roles within the organization having different permissions (e.g. a "manager" role, having all permissions to manage the miner clients; an "investor" role having read-only permissions to view miner clients for which they have a vested interest; etc.) and associate user accounts in the organization with the roles. After the manager configures the organization, roles, and permissions, the authentication system can then gatekeep requests of the application programming interface based on the permissions required for the requests and the permissions assigned to the user account operators. This gives the manager of the organization fine-grained control over which employees have access to view or change data and settings, including those that affect how packet communications of miner clients are routed.

In embodiments supporting determination of income produced by the miner client, the user account operator may log in to the graphical user interface and view or download automatically-prepared tax documentation detailing how much income was produced over some period of time. This should improve the ease and accuracy of producing tax documentation for cryptocurrency mining. In some embodiments, the application programming interface may integrate with tax preparation software. This allows the user account operator to use existing tax preparation software to report income produced by the miner client without having to enter the income manually.

In embodiments of the node supporting encrypted mining protocols, the user account operator may configure a miner client to connect to a mining pool, even if the miner client uses an encrypted mining protocol and the mining pool uses an unencrypted mining protocol, or if the miner client uses an unencrypted mining protocol and the mining pool uses an encrypted mining protocol. If either the mining pool or the miner client supports an encrypted mining protocol, the node may secure the new packet communications before sending them. This allows for piecemeal adoption of encrypted mining protocols with minimal friction for the user account operator, miner client manufacturers, and mining pool operators.

In sum, with respect to the description herein, numerous specific details are provided, such as examples of components and/or methods, to provide a thorough teaching and understanding of embodiments and underlying principles. One skilled in the relevant art will recognize, however, that an embodiment can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention.

Similarly, embodiments can be implemented in many forms, and based on the disclosure and teachings provided herein, a person of ordinary skill in the art will appreciate other ways and/or methods to implement an equivalent. Reference throughout this specification to "one embodiment," "an embodiment," or "a specific embodiment" means that a particular feature, structure, or characteristic described in connection with the embodiment is included in at least one embodiment and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as otherwise operable in certain cases, as is useful in accordance with a particular application.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the disclosure herein provided.

The invention claimed is:

1. A process including:
   accessing information, by a node in a digital network, that is exactly the same as the information that a mining pool uses when the mining pool computes a hash rate of a miner client; measuring, by the node, a hash rate of the miner client based on the information to form a computed hash rate for the miner client;
   receiving, by the node, a value reported by the mining pool for the miner client; and
   comparing, by the node, the value reported by the mining pool against the computed hash rate to determine whether to conduct reporting dishonesty to the miner client.

2. The process of claim 1, wherein the receiving includes receiving the value from a public web interface.

3. The process of claim 2, wherein the reporting dishonesty is conducted when the value reported by the mining pool is a lower performance of the miner client than is apparent to the node from the computed hash rate.

4. The process of claim 2, wherein the reporting dishonesty is conducted when the value reported by the mining pool indicates that the mining pool is unresponsive to new packet communications from the node.

5. The process of claim 2, wherein the reporting dishonesty is conducted when value indicates that the mining pool is rejecting an abnormally high percentage of work submissions in new packet communications from the node.

6. The process of claim 2, wherein the reporting dishonesty is conducted when value indicates that the mining pool is marking work, submitted in new packet communications by the node on behalf of the miner client, as being stale when the work was not stale based on interpreted packet communications.

7. The process of claim 2, further comprising automatically selecting, by the node, another mining pool with respect to the mining pool to minimize a negative effect of the mining pool becoming underperforming.

8. The process of claim 2, wherein, when a mining protocol from the miner client and a mining protocol from the mining pool are different mining protocols, interpreting the mining protocol from the miner client into the mining protocol of the mining pool.

9. The process of claim 1 wherein the node is intermediate the miner client and the mining pool; and further comprising:
   representing, by the node, the miner client to the mining pool;
   representing, by the node, the mining pool to the miner client;
   receiving packet communications of a mining protocol from the miner client;
   interpreting the packet communications to produce interpreted packet communications;
   routing new packet communications to the mining pool based on the interpreted packet communications;
   receiving other packet communications of a mining protocol from the mining pool;
   interpreting the other packet communications to produce other new packet communications; and
   routing the other new packet communications to the miner client based on the other interpreted packet communications.

10. The process of claim 9, wherein the receiving the value includes receiving the value from a public web interface.

11. The process of claim 1, further comprising sending, by the node, further packet communications that instruct the miner client to disconnect from, and reconnect to, the node, thereby allowing the representing of the miner client to the mining pool.

12. The process of claim 1, wherein the reporting dishonesty is conducted when the value reported by the mining pool is a lower performance of the miner client than is apparent to the node from the computed hash rate.

13. The process of claim 1, wherein the reporting dishonesty is conducted when the value reported by the mining pool indicates that the mining pool is unresponsive to new packet communications from the node.

14. The process of claim 1, wherein the reporting dishonesty is conducted when value indicates that the mining pool is rejecting an abnormally high percentage of work submissions in new packet communications from the node.

15. The process of claim 1, wherein the reporting dishonesty is conducted when value indicates that the mining pool is marking work, submitted in new packet communications by the node on behalf of the miner client, as being stale when the work was not stale based on interpreted packet communications.

16. The process of claim 1, further comprising automatically selecting, by the node, another mining pool with respect to the mining pool to minimize a negative effect of the mining pool becoming underperforming.

17. The process of claim 1, wherein, when a mining protocol from the miner client and a mining protocol from the mining pool are different mining protocols, interpreting the mining protocol from the miner client into the mining protocol of the mining pool.

18. A process comprising:
    configuring a node configured to carry out, in a digital network, the steps of:

accessing information, by a node in a digital network, that is exactly the same as the information that a mining pool uses when the mining pool computes a hash rate of a miner client;

measuring a hash rate of the miner client based on the information to form a computed hash rate for the miner client;

receiving a value reported by the mining pool for the miner client; and comparing the value reported by the mining pool against the computed hash rate to determine whether to report dishonesty to the miner client.

19. The process of claim 18, wherein the receiving includes receiving the value from a public web interface.

20. The process of claim 18 wherein:

the node is intermediate the miner client and the mining pool;

the node represents the miner client to the mining pool;

the node represents the mining pool to the miner client;

the node implements logic that:

receives packet communications of a mining protocol from the miner client;

interprets the packet communications to produce interpreted packet communications;

routes new packet communications to the mining pool based on the interpreted packed communications;

receives other packet communications of a mining protocol from the mining pool;

interprets the other packet communications to produce other new packet communications; and routes the other new packet communications to the miner client based on the other interpreted packet communications.

21. The process of claim 20, wherein the receiving the value includes receiving the value from a public web interface.

* * * * *